US010484455B2

(12) United States Patent
Tsao

(10) Patent No.: US 10,484,455 B2
(45) Date of Patent: *Nov. 19, 2019

(54) METHOD AND APPARATUS FOR INFORMATION EXCHANGE OVER A WEB BASED ENVIRONMENT

(71) Applicant: Sheng Tai (Ted) Tsao, Fremont, CA (US)

(72) Inventor: Sheng Tai Tsao, Fremont, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/164,016

(22) Filed: May 25, 2016

(65) Prior Publication Data
US 2016/0269471 A1 Sep. 15, 2016

Related U.S. Application Data

(63) Continuation of application No. 14/019,406, filed on Sep. 5, 2013, now abandoned, which is a continuation of application No. 12/511,039, filed on Jul. 28, 2009, now Pat. No. 8,577,839, which is a continuation-in-part of application No. 11/732,496, filed on Apr. 2, 2007, now abandoned, and a continuation-in-part of application No. 10/713,905,
(Continued)

(51) Int. Cl.
G06F 16/16 (2019.01)
G06F 16/958 (2019.01)
H04L 29/08 (2006.01)
B66C 1/42 (2006.01)
B66C 1/44 (2006.01)
B66C 1/58 (2006.01)
B66C 3/02 (2006.01)
G06F 17/22 (2006.01)
H04L 12/24 (2006.01)
H04L 12/26 (2006.01)

(52) U.S. Cl.
CPC .............. H04L 67/06 (2013.01); B66C 1/422 (2013.01); B66C 1/442 (2013.01); B66C 1/585 (2013.01); B66C 3/02 (2013.01); G06F 16/16 (2019.01); G06F 16/958 (2019.01); G06F 17/2247 (2013.01); H04L 41/22 (2013.01); H04L 43/106 (2013.01); H04L 67/02 (2013.01); G06F 2209/541 (2013.01)

(58) Field of Classification Search
CPC ............... G06F 17/30091; G06F 16/16; G06F 2209/541; H04L 41/22
USPC ........ 707/620, 623, 694, 781, 805; 709/201, 709/203, 213
See application file for complete search history.

(56) References Cited

U.S. PATENT DOCUMENTS 4,604,694 A 8/1986 Hough
5,748,896 A 5/1998 Daly et al.
(Continued)

OTHER PUBLICATIONS

Qu at al. "Implementation of an Enterprise Level Groupware System, J2EE Platform and WebDev Protoco", IEEE, 2000, p. 160-169.

Primary Examiner — Marcin R Filipczyk

(57) ABSTRACT

A method for posting and un-posting files and messages in a collaborative file sharing environment. A user is provided with the functionality of instantly stop sharing files or folders without physically deleting the files or folder.

16 Claims, 18 Drawing Sheets

Related U.S. Application Data filed on Aug. 12, 2002, now Pat. No. 7,379,990, and a continuation-in-part of application No. 10/713,904, filed on Aug. 6, 2002, now Pat. No. 7,418,702, and a continuation-in-part of application No. 11/374,302, filed on Jul. 2, 2004, now Pat. No. 7,945,652, which is a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(60) Provisional application No. 60/787,653, filed on Mar. 31, 2006.

(56) References Cited

U.S. PATENT DOCUMENTS

| | | | |
|---|---|---|---|
| 6,035,404 A | 3/2000 | Zhao | |
| 6,154,764 A | 11/2000 | Nitta et al. | |
| 6,182,116 B1 | 1/2001 | Nanma et al. | |
| 6,317,777 B1 | 11/2001 | Skarbo et al. | |
| 6,321,308 B1 | 11/2001 | Arnon et al. | |
| 6,489,980 B1 | 12/2002 | Scott et al. | |
| 6,664,978 B1 | 12/2003 | Kekic et al. | |
| 7,278,142 B2 | 10/2007 | Bandhole et al. | |
| 7,281,248 B2 | 10/2007 | Demsey et al. | |
| 7,287,030 B2* | 10/2007 | Margolus | G06F 21/6272 |
| | | | 707/959 |
| 7,353,252 B1 | 4/2008 | Yang et al. | |
| 7,448,079 B2 | 11/2008 | Tremain | |
| 7,548,930 B2 | 6/2009 | Kobza et al. | |
| 7,565,414 B1 | 7/2009 | Love | |
| 7,730,129 B2* | 6/2010 | Wang | G06Q 10/107 |
| | | | 709/204 |
| 7,853,886 B2 | 12/2010 | Drucker et al. | |
| 7,941,844 B2* | 5/2011 | Anno | G06F 21/41 |
| | | | 713/184 |
| 8,055,690 B2 | 11/2011 | Yamahata et al. | |
| 8,315,999 B2* | 11/2012 | Chatley | G06F 3/0613 |
| | | | 707/705 |
| 2001/0045965 A1 | 11/2001 | Orbanes et al. | |
| 2002/0069369 A1 | 6/2002 | Tremain | |
| 2002/0095396 A1 | 7/2002 | Freking et al. | |
| 2002/0118808 A1 | 8/2002 | Kelleher et al. | |
| 2002/0129106 A1 | 9/2002 | Gutfreund | |
| 2002/0152305 A1 | 10/2002 | Jackson et al. | |
| 2002/0186238 A1 | 12/2002 | Sylor et al. | |
| 2003/0084128 A1 | 5/2003 | Anderson et al. | |
| 2003/0084151 A1 | 5/2003 | Simpson et al. | |
| 2003/0097410 A1 | 5/2003 | Atkins et al. | |
| 2003/0115268 A1 | 6/2003 | Esposito | |
| 2003/0131051 A1 | 7/2003 | Lection et al. | |
| 2003/0182422 A1 | 9/2003 | Bradshaw et al. | |
| 2003/0236820 A1 | 12/2003 | Tiernet et al. | |
| 2004/0044648 A1 | 5/2004 | Anfindsen et al. | |
| 2004/0221290 A1 | 11/2004 | Casey et al. | |
| 2005/0091595 A1 | 4/2005 | Shappell et al. | |
| 2005/0097440 A1 | 5/2005 | Lusk et al. | |
| 2005/0120160 A1 | 6/2005 | Plouffe et al. | |
| 2005/0246441 A1 | 11/2005 | Chandrasekaran et al. | |
| 2005/0262006 A1 | 11/2005 | Beartusk et al. | |
| 2006/0075041 A1* | 4/2006 | Antonoff | H04L 67/28 |
| | | | 709/206 |
| 2006/0095514 A1 | 5/2006 | Wang et al. | |
| 2006/0242581 A1 | 10/2006 | Manion et al. | |
| 2007/0083592 A1 | 4/2007 | Bartram et al. | |
| 2007/0255712 A1 | 11/2007 | Mahoney et al. | |
| 2008/0091761 A1 | 4/2008 | Tsao | |
| 2009/0006972 A1* | 1/2009 | Karlson | H04L 67/06 |
| | | | 715/737 |
| 2009/0138808 A1 | 5/2009 | Moromisato et al. | |
| 2010/0318554 A1* | 12/2010 | Walker | H04L 63/029 |
| | | | 707/769 |
| 2011/0119353 A1 | 5/2011 | Tsao | |
| 2011/0119594 A1 | 5/2011 | Tsao | |
| 2012/0079389 A1 | 3/2012 | Tsao | |
| 2012/0084658 A1 | 4/2012 | Tsao | |
| 2012/0221957 A1 | 8/2012 | Tsao | |
| 2012/0226746 A1 | 9/2012 | Tsao | |
| 2013/0124690 A1 | 5/2013 | Liebman | |

* cited by examiner

Fig. 1: A Typical CCDSVM platform with Multiple Clients

Fig. 2A: An example of a variation of the CCDSVM platform for web-browser based communication:

Fig. 2B: A variation of the CCSDVM platform, which is a degenerated CCDSVM with only one control system to be accessed by client systems.

Fig. 3: The Software of a WCUWE for a typical CCDSVM:

Fig. 4A: Dynamic work space controlled by a control system.

Fig. 4B: an example of resources which may be assigned to a group common work space.

Fig. 4C: an example of resources which may be assigned in a user private work space.

Fig. 5: An example of resources in a CCDSVM, which may be assigned to each group or to each private work space.

Fig. 6A: An example of displaying a web-page with 4 sections in a web-browser of a user X in a user-group-1 during an interactive online meeting.

Fig. 6B: An example of displaying a web-page with 4 sections in a web-browser of a user Y of the user-group-1 during the interactive online meeting.

Fig. 6C: An example of displaying a web-page with 4 sections in the browser of the user X of the user group-1 before the interactive online meeting.

Fig. 6D: An example of displaying a web-page with 4 sections in the browser of the user Y of the user group-1 before the interactive online meeting.

Fig. 6E: An example of a displayed web-page, generated from the user group-1 online meeting of the user X and user Y, for each of a plurality of online users access without joining the user group-1 online meeting.

Fig. 7A: A displayed web page having three sections for a user X in one-to-one model for sharing messages, files and folders with a user Y Fig. 7B: A displayed web page with three sections for the user Y in the one-to-one model for sharing messages, files and folders with the user X Fig. 8A: An example of web graphically display of assigned resources in a user X's private work space.

Fig. 8B: An examples of web-based graphical display of assigned resources in a private work space of a user Y.

Fig. 8C: An example of web-based graphical display of the user Y's private work space after the user X dynamically shared a "folder 2" which from the user X's private space for the user Y.

Fig. 9A: an example of pop-up menu for folder operations
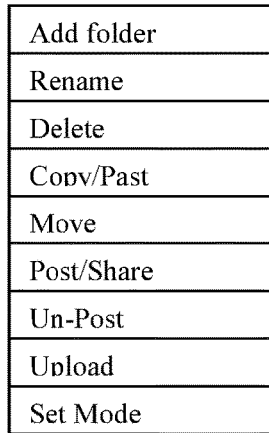
Fig. 9B: an example of pop-up menu for file operations
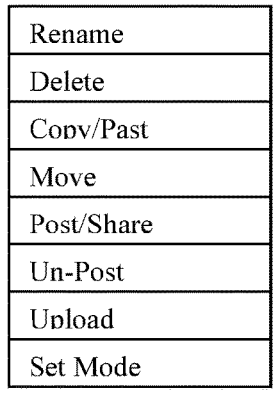
Fig. 10A: an example of non pop-up operation menu for folder operations:
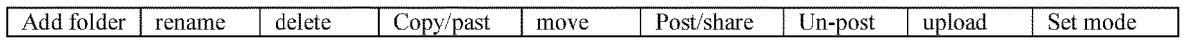
Fig. 10B: an example of non pop-up operation menu for folder operations:
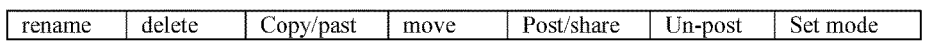

Fig. 11: An example of displaying a personal sharing management section for a user X, which comprises a list of posted (shared) files or folders in the file & folder area of a private work space of the user X.

| File or Folder Name | On System | Share to Who | |
|---|---|---|---|
| My-video jpg file | System-1 | Jane | Delete shared? |
| Project plan | Engineer-3 | Jim | Delete shared? |
| C program code for web | Support-2 | John | Delete shared? |
| Picture of building | System-1 | Jane | Delete shared? |
| Engineer Drawing | Engineer-3 | Jim | Delete shared? |
| Patent application-v1 | System-1 | Ted | Delete shared? |
| Folder 2 | System 2 of system group-A | User Y | Delete shared? |
| | | | |
| | | | |
| | | | |
| | | | |

Fig. 11

METHOD AND APPARATUS FOR INFORMATION EXCHANGE OVER A WEB BASED ENVIRONMENT

CROSS-REFERENCE TO RELATED APPLICATIONS

This application is a continuation of U.S. patent application Ser. No. 14/019,406 filed on Sep. 5, 2013 which itself is a continuation of U.S. patent application Ser. No. 12/511,039, filed on Jul. 28, 2009 and now a U.S. Pat. No. 8,577,839, which in turn is a continuation-in-part of (a) U.S. patent application Ser. No. 11/732,496 filed on Apr. 2, 2007, and claimed the benefit of U.S. Provisional Application No. 60/787,653 filed on Mar. 31, 2006, and is a continuation-in-part of U.S. patent application Ser. No. 10/713,904 filed on Aug. 6, 2002 and now a U.S. Pat. No. 7,418,702, and a continuation-in-part of U.S. patent application Ser. No. 10/713,905 filed on Aug. 12, 2002 and now a U.S. Pat. No. 7,379,990, and (b) U.S. patent application Ser. No. 11/374,302 filed on Jul. 2, 2004 and, now a U.S. Pat. No. 7,945,652, which in turn is a continuation-in-part of U.S. patent application Ser. No. 10/713,904 filed on Aug. 6, 2002, and now a U.S. Pat. No. 7,418,702, and is a continuation-in-part of U.S. patent application Ser. No. 10/713,905 filed on Aug. 12, 2002, and now a U.S. Pat. No. 7,379,990. The entire disclosures of the patents and applications herein are all hereby incorporated by reference in their entireties for all purposes.

FIELD OF THE INVENTION

The present invention generally relates to communication network. More specifically, the present invention relates to a web based communication system.

BACKGROUND OF THE INVENTION

With the increasing popularity of using the Internet and World Wide Web ("the Web") for the rapidly changing digital world, individuals as well as enterprises, exchange (or swap) large volumes of information through the Web. The demand for larger and faster information exchange has increasingly grown in recent years. For example, various business meetings and conferences are conducted over the Web with attendees scattered around the world. To enhance the communication between the meeting attendees, not only voice (and/or image) information is important, but also information exchange can be critical.

Fast, volume, and secure information exchange is important in enhancing the efficiency of a communication network. At Internet era, the web portals become a means for personal, group, or organizational communication. Therefore, an efficiency and cost effective method of creating and updating the web portal becomes critical to each business and individual.

Accordingly, there is a need in the art to provide a faster, more secure, volume information exchange over the Web.

SUMMARY OF THE INVENTION

The present invention relates to a method and apparatus for fast and secure information exchange over a web environment.

With the development of a centrally controlled distributed scalable virtual machine (CCDSVM) and the web-based computer user working (operating) environment (WCUWE), the problems mentioned in the previous section can easily be solved by introducing a "dynamic workspace" technology of this invention within the frameworks of the CCDSVM and the WCUWE.

With the dynamic workspace technology, one or more login users of a CCDSVM, each using a browser on a computing system from anywhere, can instantly perform tasks. For example, each user can post or un-post messages, files, folders, or other resources information on computing systems of the CCDSVM, with group based-model or non-group 1-to-1 model to one or more audiences (other users) on the network. This technology will also achieve larger scales of secure information exchange without size limitations and the installation of special software. Specially, this technology can dramatically improve the efficiency and cost effectiveness for updating the contents of existing web portals.

The implementation of this invention has provided users with a web-browser based system that is capable of securing exchanges of messages, files, folders, or other resources information including storage and network resources on computing systems crossing network domains without size limitations.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The resource information also can be the information of the hardware resources on the provisioned systems and the control system, such as one or more network devices of Ethernet or wireless cards, storage devices such as SCSI or RAID disk, memories, CPUs, and one or more user interface (input/output) devices such as a keyboard, a mouse, a monitor and displaying devices, and audio and video recording or playback devices and components including digital camera or video and audio encoding cards and so forth there is no limits.

The resources also could be data resources on said systems such as one or more file systems built on one or more storage devices, one or more folders and various type of data files or application files on said each file systems; or one or more record files such as user account or user group profiles, or one or more message data, where said data file can be document file such as Word, or PDF, or Spreadsheet, or PowerPoint, or plain text file, or media data of streaming video or audio file including AVI, MPEG, MP3 or JPEG image file, and said application file is binary file, such as web application.

The resources can be kept in one or more information lists and to be stored in database on storage media of the control system. The database is organized as one or more lists of tables, where each of the lists contains certain type of resources or a mixed type of resources. The storage media could be a system's internal storage such as memory or disk drive, for example.

The resource information of this invention can be encoded, displayed and operated as web folder tree in a web browser by using multi-layered item list (MLIL) in the memory of the control system. Each node of said MLIL binds with a corresponding operation menu, attributes of said resource and graphic image, where said attributes of said resource are resource's name, ID, size, location or address, time stamp, ownership, and so forth without limits. Each node of the MLIL can have its next layer of one or more sub-nodes representing another layer of one or more actual resources.

The resource MLIL can be encoded into a web page and be displayed in a user's web browser such that said user can interactively select each permitted resource node of the MLIL to perform desired tasks through said operation menu. The list of resources displayed as a web folder tree has been demonstrated in embodiments of the present invention such as depicted in FIGS. 7A, 7B, 8A, 8B, and 8C. The folder tree can be organized and displayed with one or more resource nodes, which are organized into one or more layers, and each layer is vertically aligned, right indented and displayed below the layer above it, where each node at each layer represents a corresponding resource and can have its next layer of one or more nodes for representing a corresponding resource's next layer of one or more resources if there are any.

Figure 6A:
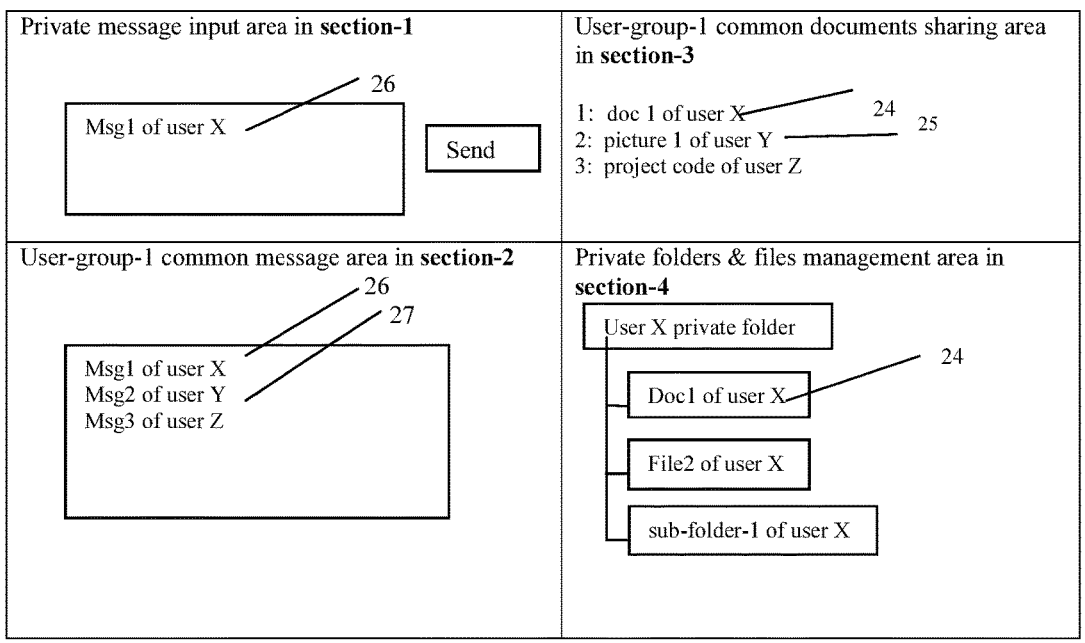

FIG. 6A illustrates an example of displaying a web page with 4 sections in a web-browser of a user X in a user group-1 during an interactive online meeting in accordance with one embodiment of the present invention; Each section of the web page can be updated and refreshed automatically and be updated/refreshed independent of other sections by a runtime control script such as a Java script or others, which can be preloaded into the web browser via an encoded web page. Of course, the entire web page also can be updated and refreshed manually by user or by a different control script.

Figure 6B:
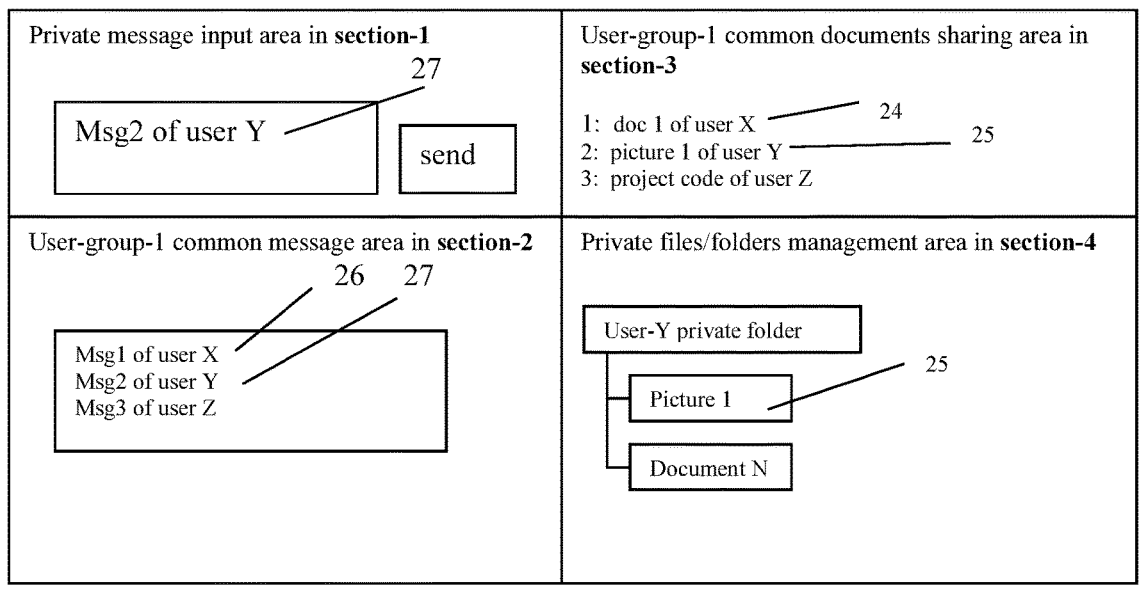

FIG. 6B illustrates an example of displaying a web page with 4 sections in a web-browser of a user Y in the user group-1 during the interactive online meeting in accordance with another embodiment of the present invention. As a matter of fact, it has illustrated that each web page can be divided into multiple screen sections and each section can be encoded with resources information actually from one or more users' private workspaces.

In one embodiment as illustrated in this figure, a section-3 is encoded with multiple files from a group common workspace, and actually posted from three private workspaces by three corresponding users of in the group-1. Also, only the actual owner of each file can from his/her displayed private workspace to un-post (withdraw) his/her previously posted file. For example, the "picture 1" was posted by user Y from his displayed private workspace, therefore, only user Y from his private workspace can be permitted to un-post this previously posted picture 1. Similarly, the displayed section-2 is encoded and displayed with multiple messages in the group common workspace, which are actually posted by multiple users through each user's displayed private workspaces. Besides, each message can be un-posted by the original user of the message from the original user's displayed private workspace.

Figure 6C:
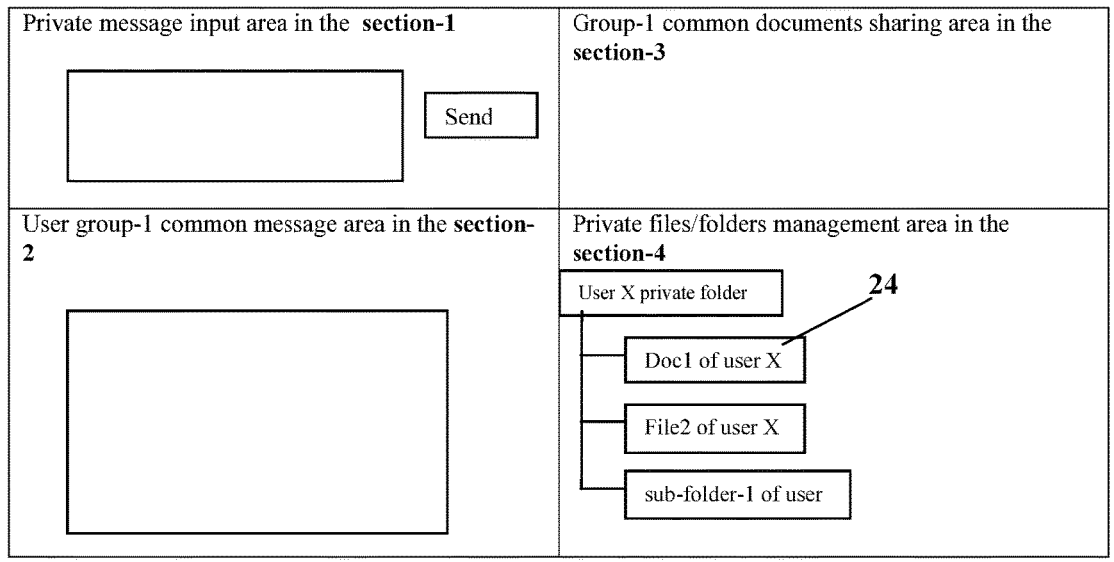

FIG. 6C illustrates an example of displaying a web page with 4 sections in the web-browser of the user X in the user group-1 before the interactive online meeting in accordance with another embodiment of the present invention.

Figure 6D:
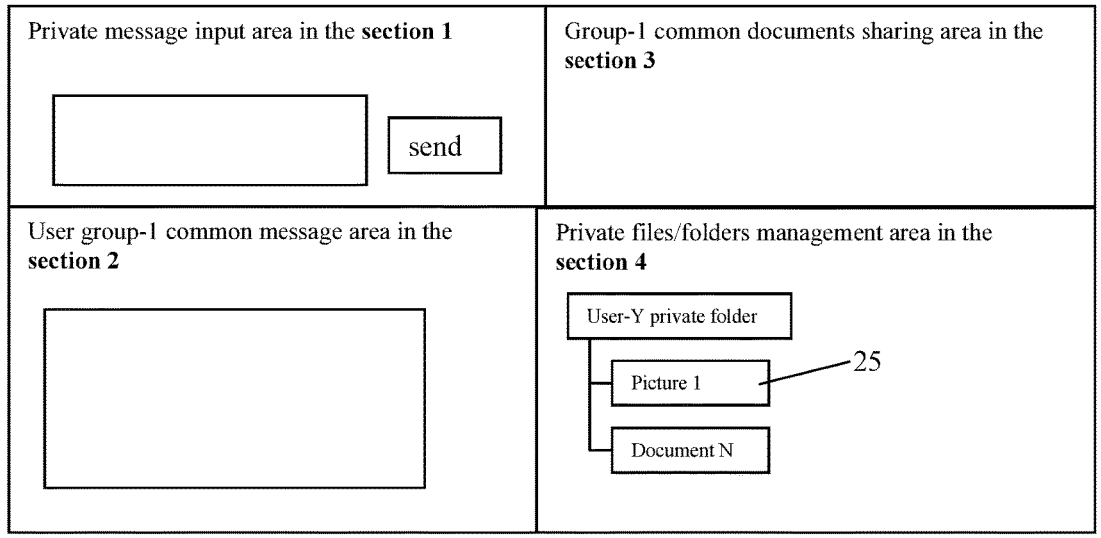

FIG. 6D illustrates an example of displaying a web page with 4 sections in the web-browser of the user Y in the user group-1 before the interactive online meeting in accordance with another embodiment of the present invention.

Figure 6E:
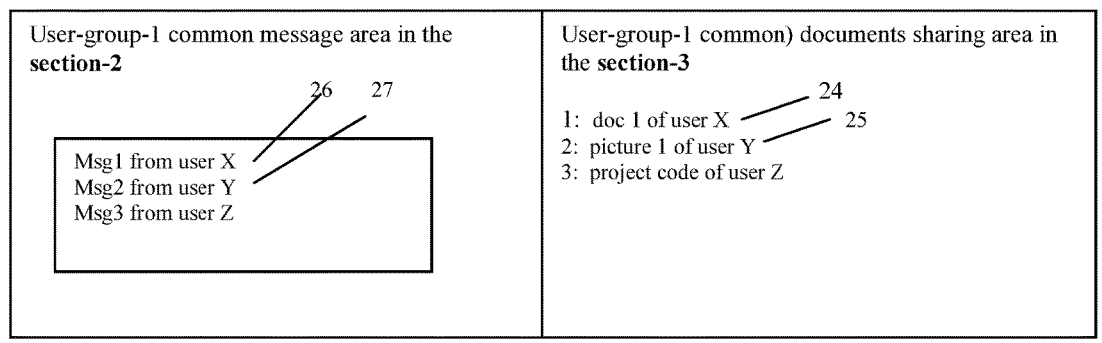

FIG. 6E illustrates an example of a displayed public web page that each massive online user can access and view from each of their browser without login to the CCDSVM during said user X and user Y in the user group-1 online meeting in accordance with another embodiment of the present invention.

Figure 7A:
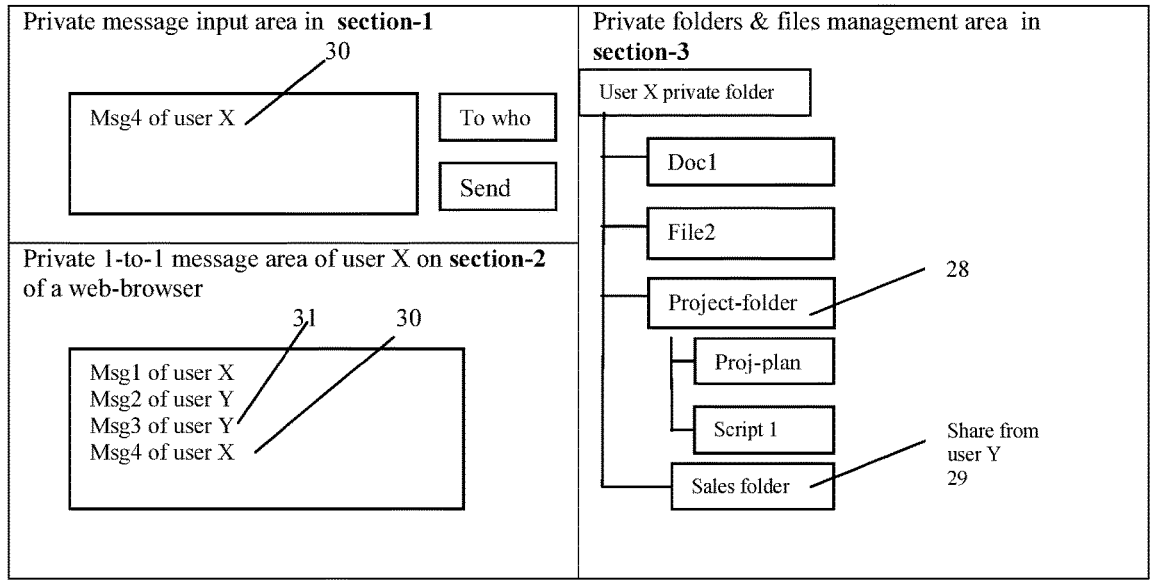

FIG. 7A illustrates one-to-one (peer-to-peer) post or un-post messages, files and folders by a user X in accordance with one embodiment of the present invention. As a matter of fact, this also has illustrated that a section of a web page can be encoded with information from multiple private workspaces because the displayed user X's private workspace also includes information posted by the user Y from the user-Y's displayed private workspace such as "Sales folder", which only user Y can withdraw it via his displayed private workspace.

Figure 7B:
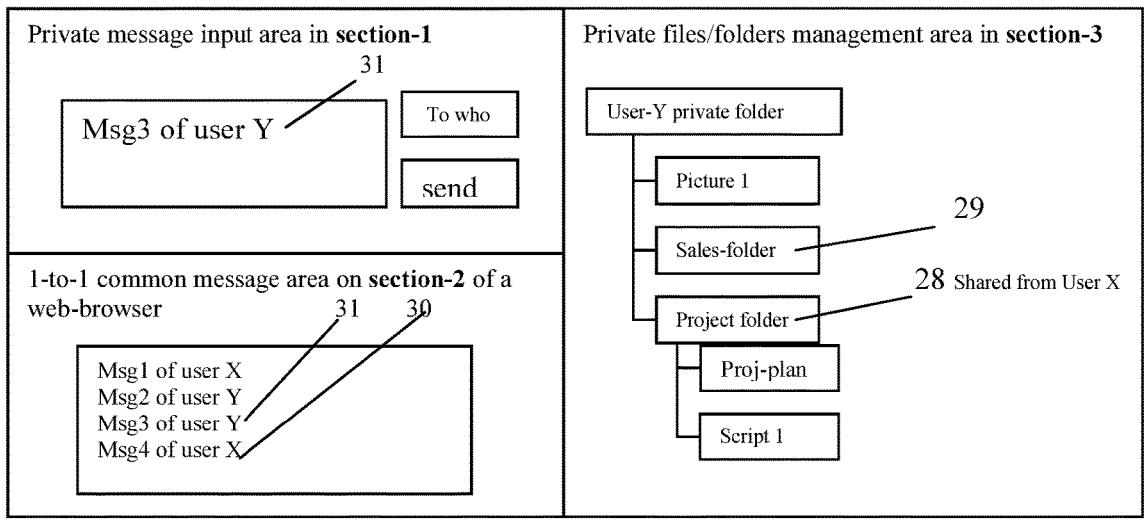

FIG. 7B illustrates one-to-one (peer-to-peer) post or un-post messages and/or information of files and folders by a user Y in accordance with another embodiment of the present invention.

Figure 8A:
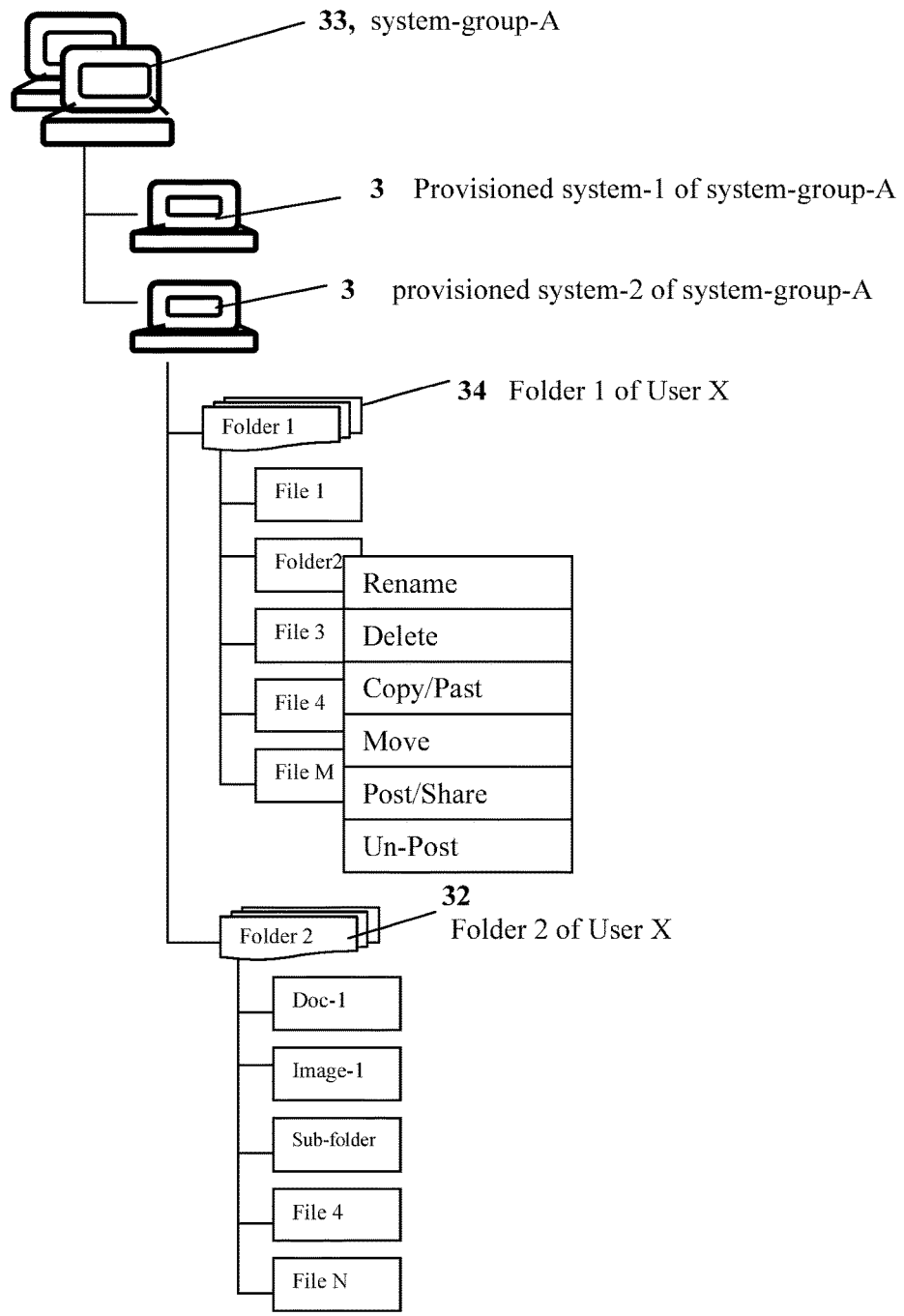

FIG. 8A is an example of a web-based graphic presentation of assigned resources in a user X's private workspace in accordance with one embodiment of the present invention.

Figure 8B:
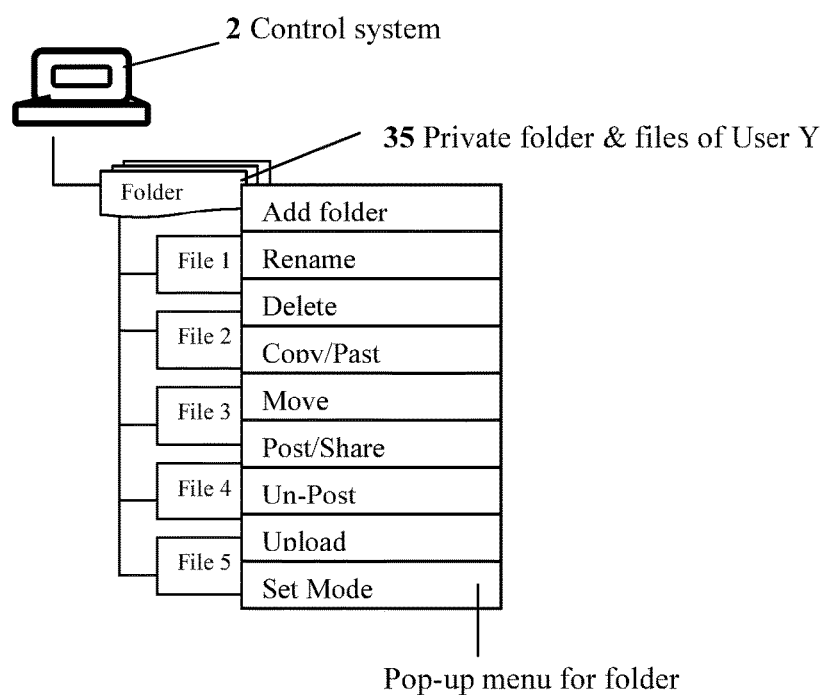

FIG. 8B is an example of a web based graphic presentation of assigned resources in the private workspace of an user Y in accordance with another embodiment of the present invention.

Figure 8C:
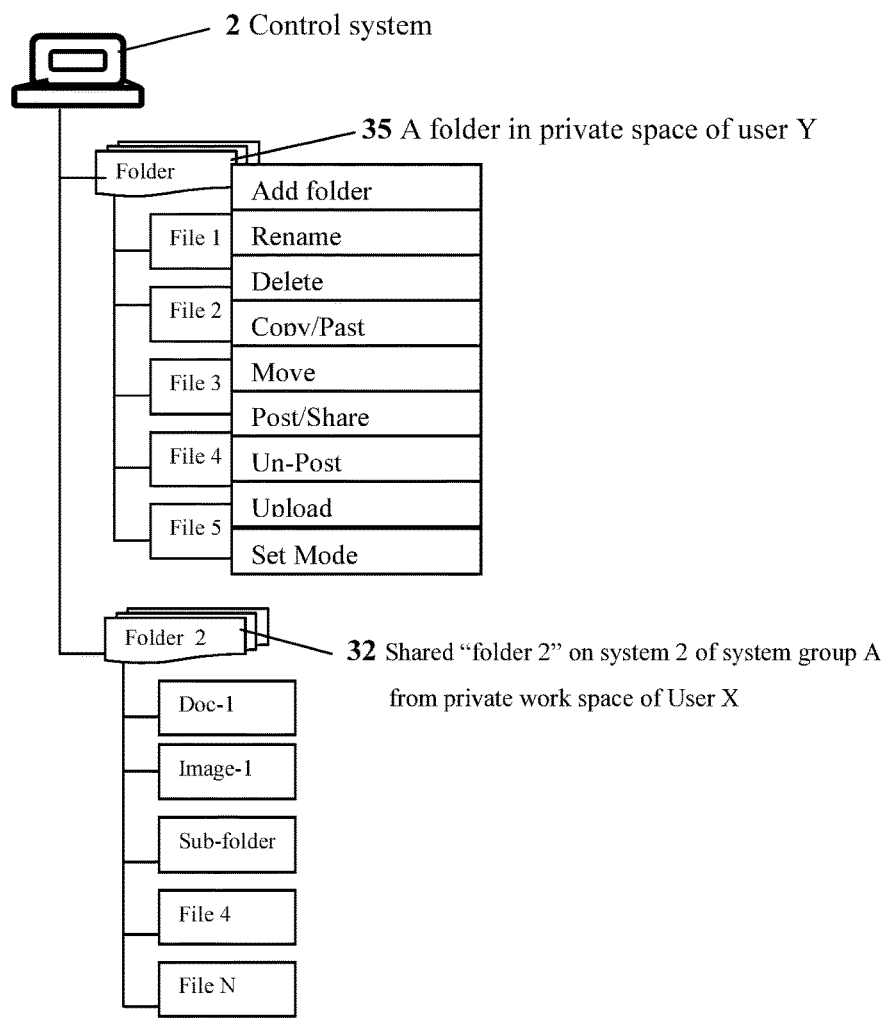

FIG. 8C is an example of a web based graphic presentation of the user Y's private workspace after the user X dynamically posted and shared a "folder 2" through the displayed user X's private space in accordance with another embodiment of the present invention.

The FIGS. 7A, 7B, 8A, 8B, and 8C also have illustrated how the web folder tree can be used to organize resources in workspaces for efficiently operating and managing resources during communication and sharing activities. The web folder tree can be operated in a similar way as the native window based folder tree; A user can select a node to expand and display its sub-nodes if there are any, and said user also can select a previously expanded node to collapse and hide all of its sub-nodes from the displaying. Therefore, said user can continuously browser and expand said sub-node of a folder tree as long as there are next levels of resource nodes until finding a targeted resource node. Since each node is bound with an operation menu associated with one or more options for different tasks, the entire displayed resource folder tree can be conveniently accessed and operated.

FIG. 9A is an example of a pop-up menu for folder in accordance with one embodiment of the present invention.

FIG. 9B is an example of a pop-up menu for file in accordance with another embodiment of the present invention.

FIG. 10A is an example of a non pop-up operation menu for folder in accordance with one embodiment of the present invention.

FIG. 10B is an example of a non pop-up operation menu for file in accordance with another embodiment of the present invention.

FIG. 11 is an example of a displayed list of posted files or folders from a sharable file & folder area of a common workspace of a user X, through which the user X can smoothly manage the massive sharing of information for participating one or more 1-to-1 communications with different communication partners, or for participating group model-communication in accordance with one embodiment of the present invention.

Figure 12:
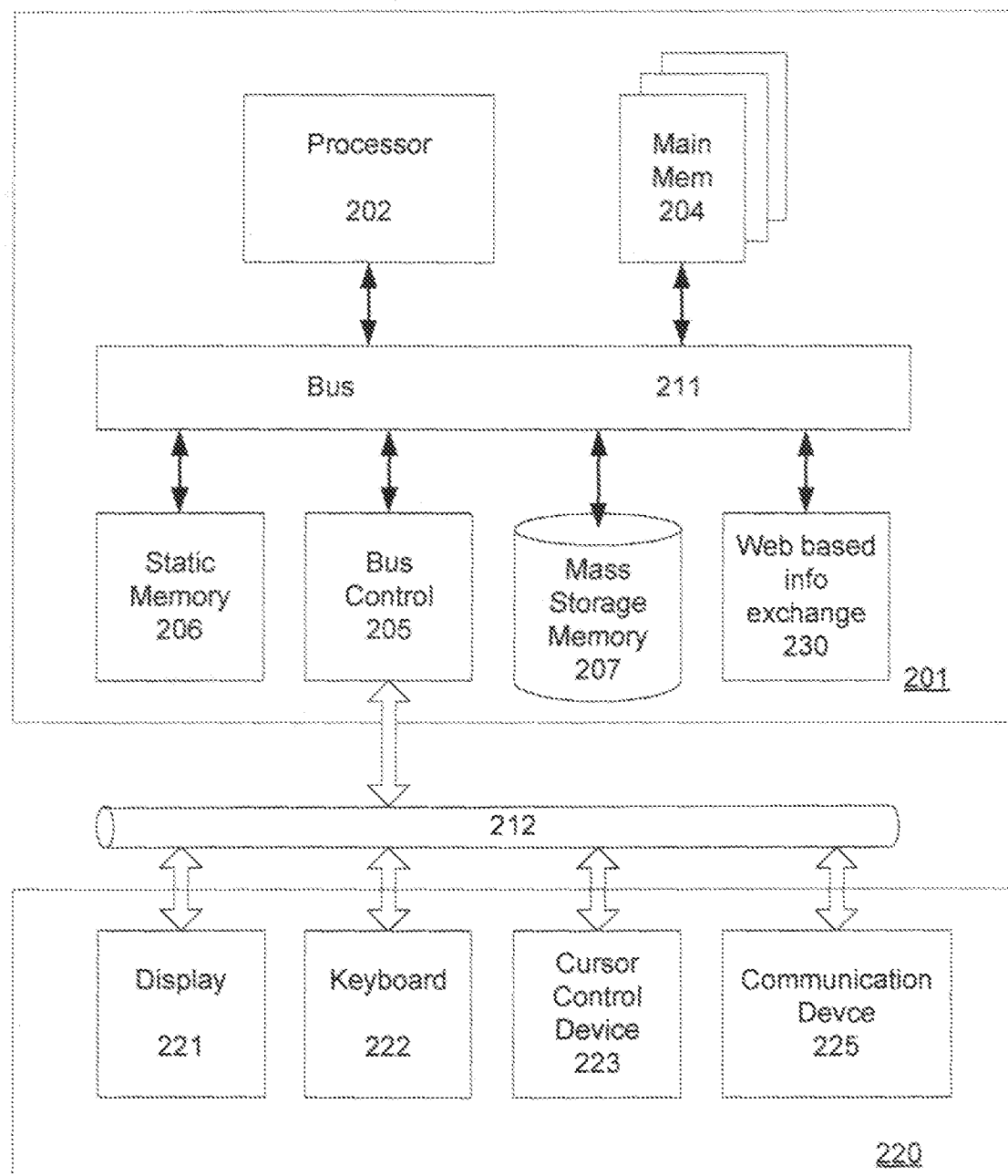

FIG. 12 has illustrated a computer system and its components.

DETAILED DESCRIPTION

Embodiments of the present invention are described herein in the context of a method, system and apparatus for providing a web based communications network with fast, volume, and secure information exchange. Those of ordinary skill in the art will realize that the following detailed description of the present invention is illustrative only and is not intended to be in any way of limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various combined types of operating systems, computing platforms, computer programs including various software modules, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Those of ordinary skill in the art will realize that the following detailed description of the present invention is illustrative only and is not intended to be in any way of limiting. Other embodiments of the present invention will readily suggest themselves to such skilled persons having the benefit of this disclosure. It will be apparent to one skilled in the art that these specific details may not be required to practice to the present invention. In other instances, well-known circuits and devices are shown in block diagram form to avoid obscuring the present invention. In the following description of the embodiments, substantially the same parts are denoted by the same reference numerals.

While particular embodiments of the present invention have been shown and described, it will now be apparent to those skilled in the art having the benefit of this disclosure that many more modifications than mentioned above are possible without departing from the inventive concepts disclosed herein. Therefore, the appended claims are intended to encompass within their scope, all such modifications are within the spirit and scope of this invention.

Figure 1:
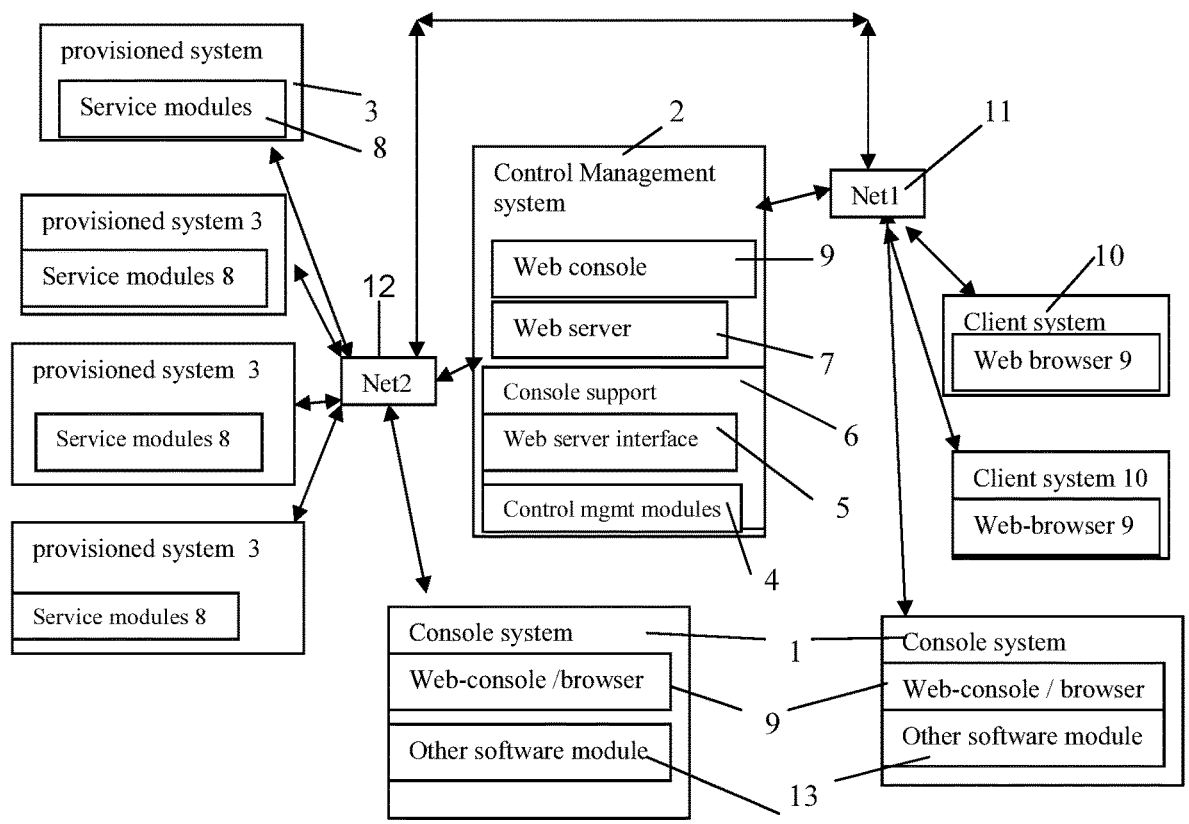
FIG. 1 is a block diagram illustrating a layout of a CCDSVM with a central control management system and multiple provisioned systems, client systems and console systems in accordance with one embodiment of the present invention.

The present invention can be implemented by a web based system operated in a network infrastructure, such as a central controlled distributed scalable virtual machine ("CCDSVM"). FIG. 1 illustrates a CCDSVM in accordance with an embodiment of the present invention. The CCDSVM includes one or more groups of provisioned systems 3 that automatically forms one or more service groups/pools, a control management system 2, console systems 1, and client systems 10. The control management system ("control system") 2 is configured to control one or more groups of systems ("provisioned system") 3. Console systems ("console systems") 1 provide management while client systems 10 ("client systems") initiate accessing the provisioned systems 3 and control system 2 via a web-browser over a network infrastructure, such as Intranet, the Internet, and/or LAN.

The network infrastructure ("network") includes all necessary hardware and software resources that facilitate various users from different geographic locations to communicate through the Internet, Intranet, and/or LAN. The hardware of the network includes network connection media, wireless media, circuitry components, and communication equipments. The network connection media includes various cables such as Ethernet and/or optical fiber. The wireless media is capable of establishing wireless communication links through air. The circuitry components include processor, data bus, memory devices, and/or circuit board. The communication equipments, such as switches, routers, gateways, and/or adapters, are used to provide a communications network. It should be noted that there are other possible elements of communication equipment that may be needed to form a communication link, but they are not necessary to understand the present invention.

The network of the CCDSVM provides scalable bandwidth and computational powers for the CCDSVM. In one embodiment, one or more switches and routers can be added and removed for the network of the CCDSVM for dynamically connecting and adding or removing one or more provisioned system units for the service pools/groups of the CCDSVM in response to the service and bandwidth and capacity requirements for providing services to meet the demand from more users on the client systems.

The software infrastructure includes Internet Protocol ("IP") addresses and system name identification software such as Domain Name Server ("DNS"), firewall software, IP gateway set-up software, IP broadcast, and so forth without limit. The communication protocols over the network could be IP based standard or non-standard proprietary protocols such as Hypertext Transfer Protocol ("HTTP/HTTPS") over Transmission Control Protocol/Internet Protocol ("TCP/IP") or Simple Object Access Protocol ("SOAP") over TCP/IP. It should be further noted that some IP based protocols are proprietary protocols and some are non-IP based protocols.

A web-browser is an application program that allows a user access to information over the Web, such as Windows Internet Explorer ("IE"), Firefox, or Netscape, and/or Mozillar. A web browser could also be proprietary software, which uses web-protocols such as HTTP, WAP, or SOAP for communication with web server over the network. The web browser can be implemented with any or a combination of suitable programming languages such as C, C++, Java, or XML. In another embodiment, the web browser can be replaced with another networked user interface tool/application, which can be implemented using non web based specialized protocols.

A web page, on the other hand, is displayable for resource information that is accessible through a web-browser 9. In present invention, the web pages are used for displaying the user interface part of the WCUWE for users from each user's web browser 9 performing interactive tasks. The web pages may be hosted by a web server via a web server system and can be transmitted (or retrieved) by a web-browser. The web-page can be implemented with any or a combination of suitable programming languages such as C, C++, Java, or HTML, XML, WML and so forth without limitation.

The provisioned systems 3, client systems 10, console systems 1, and control management system 2 are computing systems which could be a server system, such as database server, web server, email server, video server, file server, storage server such as NAS or SAN, or a security monitoring device with video and audio recording and playback devices, or a desktop or laptop system, handheld wireless devices such as PDA, wireless phone, and so forth without limit. The computing systems include hardware resources of electronic components or devices such as CPUs, storage devices, input/output and display components and memory controllers. The storage devices include internal memory such as read-only memory ("ROM") and/or random access memory ("RAM"). The storage devices may further include external storage devices such as magnetic disks or tapes, which include a redundant array of inexpensive disk drives ("RAID"), just bunch of disk drive ("JBOD") and memory sticks. The associated storage controller can be Integrated Drive Electronics ("IDE"), Small Computer System Interface ("SCSI"), a Fiber optical controller, or a combination of above-mentioned devices without limitation.

The computing systems also include non-embedded or real-time embedded OS-running, which could be Linux, or Windows, Unix, or a proprietary OS. It should be noted that the present invention may include multiple control systems at different layers in a system configuration topology, where each of the control systems is capable of communicating with each other through a network. The control systems at the middle layers play dual roles as both a control system and as a provisioned system in the system configuration topology.

FIG. 1 illustrates a CCDSVM platform with multiple clients in accordance with one embodiment of the present invention. The CCDSVM includes console systems 1, a control management system 2, provisioned systems 3, and networks 11-12, wherein networks 11-12 are used for interconnecting with all systems of the CCDSVM and the client systems 10.

A console system 1 is a computing system having a web browser or web-console 9, where, the web-browser 9 is used by privileged users for accessing the CCDSVM platform. The web browser 9, which could be on any system, permits a user to access information of the CCDSVM by following a web URL link in one embodiment. For example, a privileged user enters a URL of "https://69.107.28.123/stt/sttwebos" on a command line of the web browser 9 and once the link is established, the user can obtain information hosted by the web based computer user work/operation environment ("WCUWE"). The console system 1, in one embodiment, further includes software modules 13, wherein modules 13 may be used to facilitate communication between the console system 1 and the control management system 2.

To support a non-web based networked user interface, the console system 1 can have a specialized software module 13 using protocols other than mentioned web protocols. In another embodiment, if the control system 2 supports a non-web based network computer user work environment ("NCUWE"), a user from a program on user's native system, which can be provided by the other software module 13 of the console system 1, can send a similar request to the control system 2 to indicate accessing a desired networked program of the NCUWE on the control system 2.

The control system 2, in one embodiment, is a server system, a desktop or a laptop system or even a wireless devices with respective memory and storage capabilities. The control system 2 includes a web server software 7 and console supporting software 6. The console supporting software 6 includes web server interface software modules 5 and control management software modules 4. The control management system 2 may also have a web-browser 9 used as a web-console 9 of the control system 2. The web server software 7 sends/receives data to/from the web-console 9 of the console system 1 or the client system 10 or the control system 2. The web server software 7 is configured to provide secure sockets layer ("SSL") encryption to encrypt the data before its transmission to enhance the security. The web server software 7 could be commercially available software such as Apache™ from open source, or IIS from Microsoft or a proprietary software. The web server software modules 7 and the console support software modules 6 can be implemented by suitable or a combination of suitable programming languages such as C, C++, Java, JavaScript, HTML, or XML.

The console supporting software 6 communicates with service software modules 8 of each of the provisioned systems 3. The web server interface 5 of the console support software 6 is capable of providing special functions that are otherwise performed by web server 7. If no provisioned system 3 is coupled to the CCDSVM platform, the control management system 2, in one embodiment, is reconfigured to continue monitoring systems over the network while the CCDSVM platform is also reconfigured as a single standalone system as shown in FIG. 2B. Users can access and/or obtain objects or system resources information via a web-browser 9, which can reside a client system 10 or a console system 1 or a control management system 2.

The provisioned system 3, in one embodiment, is a computational system, where-the system may contain suitable operating system ("OS"). The provisioned systems 3 can be automatically provisioned by the control system 2 through a variation of the automatic system service pool construction protocol, which is a proprietary combined sequence steps of TCP/UDP/IP protocols as described in prior parent application entitled "Method and Apparatus for Web-based Storage On Demand" to form one or more service pools (system groups) based on group ID. Provision process, also known as the pooling process, is a method allowing the control system 2 to control one or more networked systems 3 by reconfiguring the network systems 3. For example, when a provisioned system 3 boots up via said communication protocol, the control system 2 detects and obtains provisioned system's name, IP address, and other system information, where the system information includes network information, service group ID, storage information, file system information and so forth without limits, and further stores these information into a provisioned system unit information lists in a database on the control system 2.

Each provisioned system 3 can be monitored, accessed, and/or operated by a user(s) through said web browser 9 after the provisioning process. The control system 2 also updates the status of a provisioned system 3 in a service pool in response to detect the shutdown or link down of the provisioned system and in response to admin staff's maintenance requests for removing the provisioned system from service pools.

In an alternative embodiment, a provisional system 3 is operated by users through client systems 10 or console system 1 via a control system 2 with proper authentication. Each provisioned system 3 contains service software modules 8, which is used to communicate with the control system 2, the console system 1 and the client system 10. For example, the service software modules 8 of a provisioned system 3 can communicate with the control management software 4 to carry out tasks for monitoring, accessing or managing resources of the provisioned system 3. The service software 8 can communicate with the web browser 9 of the client system 10 or the console system 1 or the control t system 2 to transfer data between them or to deliver service to them, or to communicate with another provisioned system 3 to send or receive data.

In one embodiment, the CCDSVM provides the service software modules 8 to includes the functionalities of the console support software 6 and web server software 7 of the control system 2 to form the WCUWE of the provisioned system 3. Therefore, when a user login to the control system for access to the CCDSVM, the user also can access the permitted WCUWE of the provisioned system 3 via a displayed entry point of the user's private workspace in the user's web browser. Further, each provisioned system 3 is able to provide data and application services for one or more client systems 10 independent of other provisioned system 3 and without going through the control system 2 again.

In one embodiment, one or more spare provisioned systems 3 can be provided, where each spare system 3 is configured with identical service applications and data as one or more corresponding provisioned systems 3 configured, in each service pool, for providing fault handling. Once the control system 2 detecting a faulted provisioned system 3, it can immediately instruct a corresponding spare provisioned system 3 to provide the service replacement for the faulted provisioned system 3 to provide continued service for one or more clients 10. In addition, the using of spare system 3 has certain advantage, for example, one spare system 3 can serve one or more provisioned systems 3.

The service software modules 8 may include special software modules having compatible functionalities of the web-server software 7 of the control system 2 and dedicate handling of HTTP/HTTPS protocol or other web protocols if there is need for web-based communication with clients 10 or with other provisioned systems 3 or with the control system 2. In another embodiment, the service software modules 8 can be implemented to communicate with non web browser based networked user interface by deploying specialized network protocols such as non-web based TCP/UDP/IP protocols. The service software modules 8 could include commercially available web server software 7 or proprietary software. The service software modules 8 could be implemented with any or a combination of suitable programming languages such as C, C++, Java, or JavaScript.

Net 11 and Net 12 are network infrastructures of the CCDSVM that are capable of providing communication links between the control management system 2, console systems 1, client systems 10, and/or the provisioned systems 3. The Net 11 and Net 12 comprises one or more switches and/or routers for providing scalable network, where the switches and routers can be added or removed along with adding or removing one or more provisioned systems 3 in response to the services requirements.

The client systems 10 may not be a part of the CCDSVM, but with permission and authorization, one or more users each from a web-browser 9 of a client system 10 can login to the CCDSVM and access the permitted resources of the CCDSVM, by following a web URL link of the CCDSVM. To support non-web based network user interface, the client system 10 can have a specialized software same as the software module 13 of the console system 1. While privileged users can obtain, manage, access, and/or operate system resources of the CCDSVM through the WCUWE, regular (non-privileged) users at client systems 10 may be permitted to access only limited system resources of the CCDSVM. The prior applications entitled "Concurrent Web Based Multi-Task Support for Control Management System," and entitled "Display multi-layers list item in web browser with supporting of concurrent multi-users" have described how to setup the user security profile for one or more users interactively selecting and accessing permitted resources and performing various permitted tasks via one or more displayed permitted folder trees/MLIL.

The CCDSVM configuration, in one embodiment, includes four data (flow) paths. The first data path is a communication link between a web browser 9 of a client host 10 (or a console host 1 or a control management system 2) and web handling software on the control system 2 such as web-server 7 and console support software 6. With this path of data flow, whenever a user sends a request from the web-browser 9 to the web-server 7 and further to console support software 6, the console support software 6 collects required information from target systems and converts (encodes) them into standard structured information (web-format/web-page) for web communication by using any or a combination of suitable programming languages such as C, C++, Java, Javascript, HTML, XML, WML and so forth without limits. The targeted system could be one of the provisioned systems 3 or the control system 2.

The information collected by the console support software 6 of the control system 2 could be, in one embodiment, the system status, storage information, network information, user authentication profile, the file system information, files & folders information on the control system 2, or any targeted provisioned system 3. The console support software 6 then passes this converted structured information (web page) to the web server software 7 and further transmits to web-browser 9 through the communication link Net 11 and/or Net 12 so that it can be displayed and viewed by a conventional web browser 9, as shown in FIG. 1.

The communication protocol used between the web-browser 9 of the client system 10 (or the console system 1 or the control system 2) and the web server 7 of the control system 2 could be HTTP, HTTPS (SSL encrypted HTTP protocol) or any suitable web protocols for web communication, which could successfully transmit the data on the web or could be other standard or proprietary IP-based or non-IP-based protocols. This data path may be simply referred as the console support software 6 transferring data to/from said web-browser 9.

In one embodiment, if the control system 2 is configured with multiple network interface equipments, the console support software 6 detects from which network interface a requested data stream, submitted from a web browser 9, is coming from. Therefore, the console support software 6 will provide a response web page back to the web browser 9 via the same communication link that includes the identified network interface equipment.

The second data path is the data flow through the communication link between the control system 2 and the provisioned systems 3. Requests targeted to a provisioned system 3 are passed from the console support software 6 of the control system 2 to the service modules 8 of the provisioned systems 3 through the communication link network 12. When the requests are received by a provisioned system 3, the service modules 8 of the provisioned system 3 will carry out the requested tasks, and if there is needs, the service software 8 of the provisioned system 3 then sends a response back to the console support software 6 of the control system 2, and further let the control system 2 provides a response back to the user's requested browser. In another embodiment, the service software modules 8 of the provisioned system 3 provide a response back to the user directly without going through the control system 2 again.

The implementation of the actual products of this invention for the second data path may use proprietary TCP/UDP/IP based protocols for the communication between the provisioned systems 3 and the control system 2. However, other standards or proprietary IP-based or suitable non-IP-based protocol are also possible. The communication protocols used between the console support software 6 of the control system 2 and the service modules 8 of the provisioned system 3 can be suitable IP based or non-IP based protocols, whichever is suitable to transmit data between them. The typical data flow through this path could be the boot message, system status, network information, or storage information of provisioned system 3, and so forth without limits as shown in FIG. 1.

The third data path is the data flow between provisioned systems 3 and client systems 10 or console systems 1 via the communication link 11-12. Referring back to FIG. 1, in one embodiment, the console support software 6 of the control system 2 may present a web link, which points to an object on a provisioned system 3, to be displayed in a web-browser 9 of a client system 10 or console system 1 or control system 2. The object pointed by the web link on the provisioned system 3 could be a text file, MPEG video, digital picture, PDF document, MS Power Point, or Word documentation without limit. It also could be a link to another web service program. From the web browser 9, a user can directly access to the information on a provisioned system 3 pointed by the web link without going through the control system 2 again. In this case, the service modules 8 of the provisioned system 3 also include web server software modules, or equivalent one to directly support the web browser 9 as mentioned before. The communication protocols used with the third path could be web protocols such as HTTP or WAP. Alternatively, the communication protocols can be other standards or proprietary IP-based or non-IP-based protocols. To simplify the discussion, the data transmitted on this path will be mentioned as the service software module 8 that send data to or receive data from said web-browser 9 or vice versa.

The fourth data path is data flow through a communication link between a provisioned system 3 and another provisioned system 3. With this path, the service modules 8 of one provisioned system 3 can directly transmit data or information to the service modules 8 of another provisioned system 3 via a communication link Net 12 without going through the control system 2. The implementation of the actual products of this invention, for example, uses a proprietary IP-based protocol for communications between the two provisioned systems 3.

The principle of this invention, however, does not rely on or limit to proprietary protocol. It should be noted that other standard or proprietary IP-based or suitable non-IP-based protocol may also be possible. The data and information transmitted through the fourth data path can be various types of data. For example, a user on a web-browser 9 may open a file folder on a provisioned system 3. Further, the user can also instruct to select and transfer a file or file folder from provisioned system 3 to another provisioned system 3 by an interactive click mechanism. The data file or file-folder will then be transferred directly between the two provisioned systems 3 without going through the control system 2.

Figure 2A:
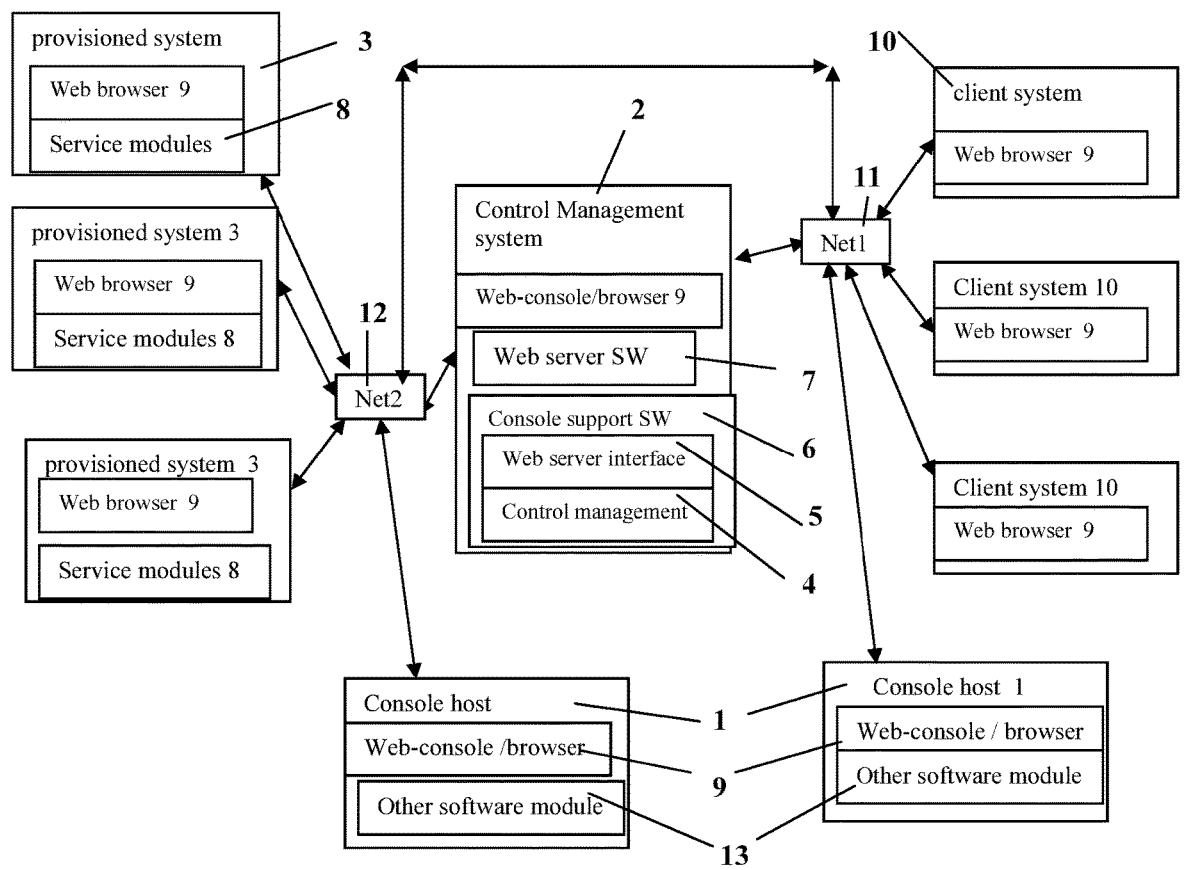
FIG. 2A is a block diagram illustrating a layout of a CCDSVM with which each of user from a web browser on a provisioned system can communicate with each other in accordance with another embodiment of the present invention.
Figure 2B:
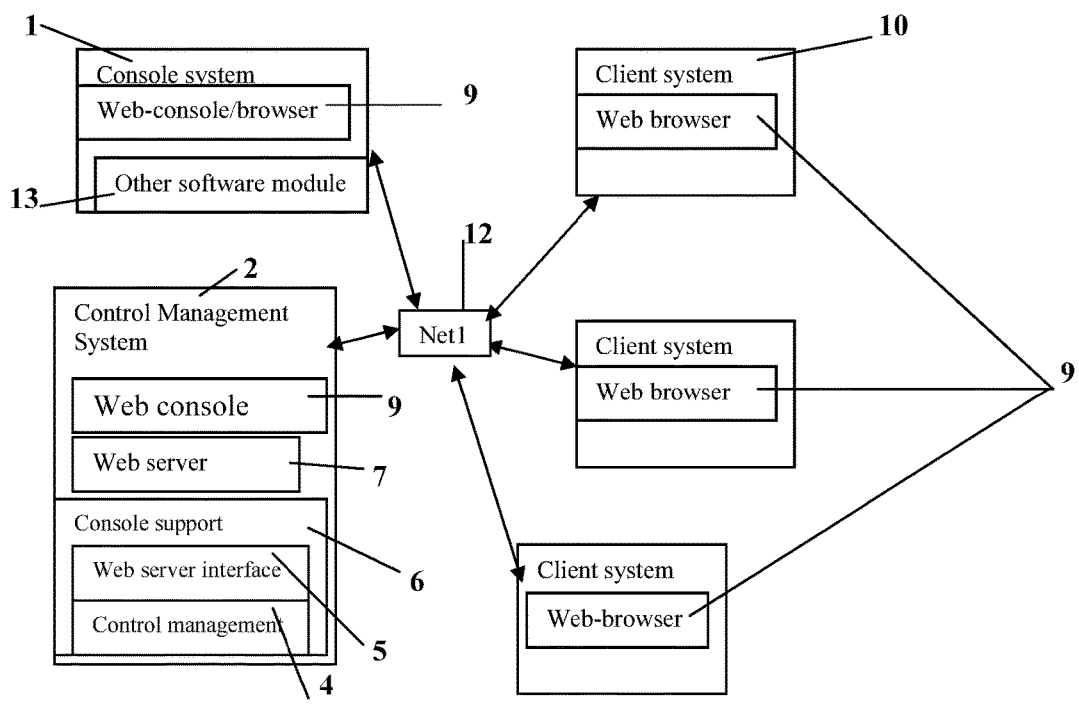
FIG. 2B is a block diagram illustrating a layout of a CCSDVM with only a single control management system to be accessed by massive client systems in accordance with another embodiment of the present invention.

FIG. 2A illustrates a variation of the CCDSVM platform for web browser based communication in accordance with one embodiment of the present invention. The CCDSVM platform illustrated in FIG. 2A is similar to the platform illustrated in FIG. 1 except every provisioned systems 3 includes a web-browser 9. Also, the client system 10 can have same software modules 13 as the console system 1 has.

Thus, with proper authentication process, each user of provisioned systems 3 may access, manage provisioned system 3 from a web browser 9 either on the user's local provisioned system 3 or on a client system 10 anywhere on a network. It should be noted that when a user is registered with a provisioned system 3, the user is authorized to access the provisioned system 3 locally but not with the CCDSVM. On the other hand, when a user is registered with the CCDSVM, the user is not only can access the user's local provisioned system 3 but also can be authorized to access multiple provisioned systems 3 and the control system 2 of the CCDSVM.

FIG. 2B illustrates another example of a variation of the CCDSVM, in which there is no provisioned systems 3 in the CCDSVM. The control system 2 can run by itself and the CCDSVM has degenerated into a single stand-alone system. The users, each through a web-browser 9 on a client system 3 (or on a console system 1, or on stand-alone control system 2) is allowed to access and manage the stand-alone control system 2 via the WCUWE of the standalone control system 2.

Unless specifically specified, the console support software modules 6 of the control system 2, the provisioned systems 3, the service software modules 8 of the provisioned system 3, and the web-browser 9 on the control system 2, client system 10, and console system 1 are referred as the CCDSVM platform illustrated in FIG. 1.

Figure 3:
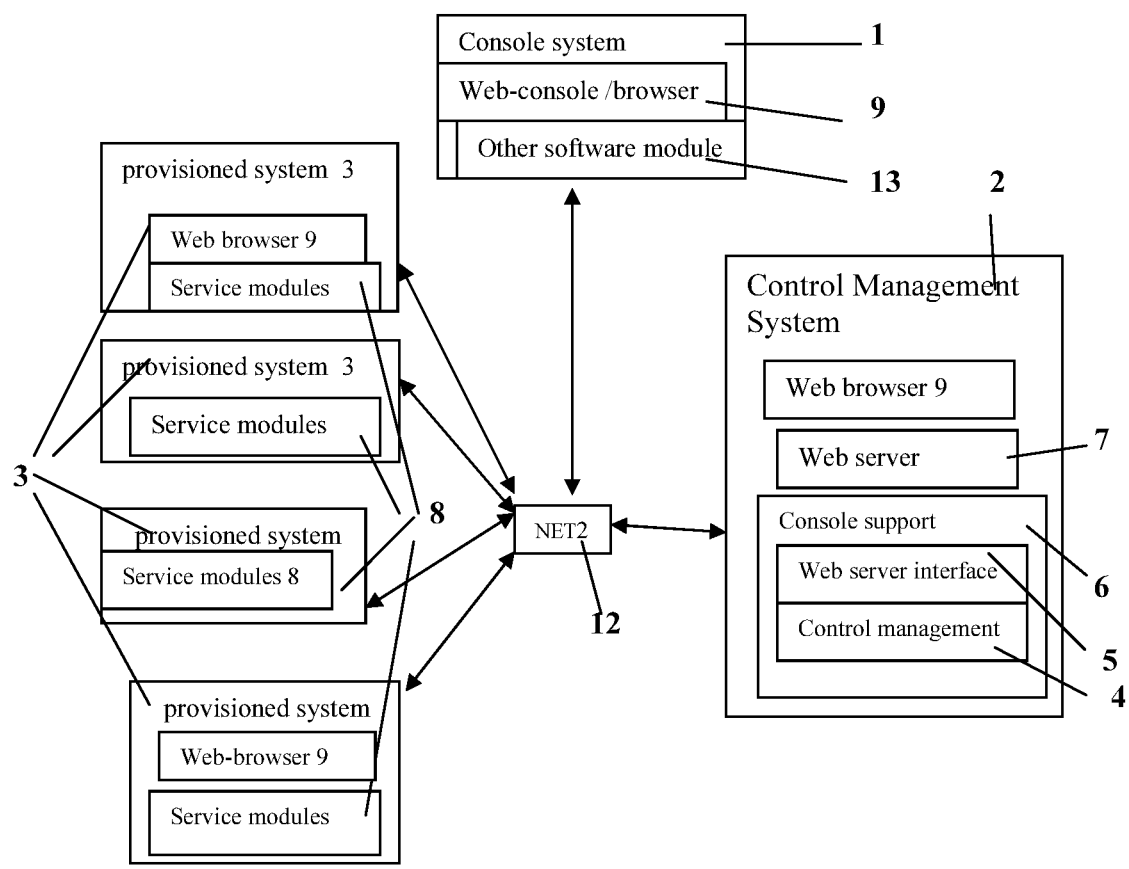
FIG. 3 is a block diagram illustrating an example of software structure for a CCDSVM in accordance with one embodiment of the present invention.

A web-based computer user work/operation environment ("WCUWE") of the CCDSVM is provided by a software infrastructure, shown in FIG. 3. The WCUWE provides each permitted user to log into the CCDSVM and further provides each login user a private web browser based operating environment, which is a private workspace including one or more assigned and permitted resources on the control system 2 or provisioned systems 3 on the network.

In one embodiment, the user private workspace 16 can be initially assigned and displayed, in a web browser, with limited resources such as displaying of an entry point of the user's top level home directory for managing one or more next levels of file-folders and their files, an entry point for update of user's password or managing one or more user's authentication, an entry point for accessing network, an entry point for monitoring and managing hardware devices including storage devices, an entry point for joining 1-to-1 personal communication, and an entry point for joining group collaboration including access on-the-fly streaming video provided from another user's digital camera or from archived streaming videos for the meeting, and so forth without limits. The user private workspace 16 can be encoded into a web page and displayed in a user's web browser, upon the user's log in to the control system 2 for accessing the CCDSVM, via suitable or a combination of suitable programming languages.

In another embodiment, the owner (assigned user) can dynamically managing resources in the private workspace such as to create a new file under a file-folder by using editing or other proper application tools, delete one or more files or file-folders, copy or move files or file-folders from a source file-folder either on the control system 2 or on any provisioned system 3 in the CCDSVM into the user's permitted file-folders/directories of the CCDSVM, or upload files from the user's a native device's local drives into user's permitted file-folder/directory, or transmit files or file-folders from the user's native system's local drives into the user's default home file-folder/directory structure via a specialized file and file-folder transfer mechanism.

In one more embodiment, the user's private workspace in the CCDSVM displayed in a web browser 9 also can be connected to the user's local file-folder/storage drives on the user's native system via communication between the console support software modules 6 and the service software modules 8 on the user's native system as depicted in FIG. 2b. Therefore, the file-folders on storage drives of the user's native system can be displayed and be accessed via the user's displayed private workspace of the CCDSVM.

The WCUWE further provides each user from a single web-browser 9 to interactively perform various permitted tasks and operations over various system resources (FIG. 5) where the tasks can be performed concurrently from a single web-browser 9. The tasks include user authentication management, such as allowing privileged users to create users, groups, assign users to each group, to assign initial resources to each user or group, and to save the information of created users and groups into a database stored on a storage media of the control system.

The information of users or groups includes user names, user IDs, assigned security permissions, passwords, access points, group name, group ID, maximum members in a group, and so forth. The assigned security permissions include the user's role and credential information, which further includes from where the user can access the CCDSVM, and what service group/pool the user can access, what system and what specific resources on a system the user can access, and what task the user can perform. The user's security permission is encoded into a security data structure, where one or more fields of the security data structure containing one or more bits with bit-status of on or off to represent the status of one or more specific credential or permission for the user.

The privileged user can dynamically grant or revoke other user's security permissions and credentials via interrogating each user's security profile by inspecting, checking, and changing the status of each security permission field, or assign or deny each specific user to access the resources of the CCDSVM via set access control options from operation menu associated with the resources.

In addition, the console support software 6 of the control system 2 keeps tracking records for each user's every login session including the time of login and the time of log out, at what time performed what task or access what data or applications. In one embodiment, the console support software modules 6 receives and parses each user's accessing request, and writes information of each user's request into an access record in a per user secure access file, which can be linked to each user's security profile for real-time fast interrogation. In one embodiment, the per user secure access record file can be backup by copying it to another file with a special name tag, and it can further be emptied on a periodic bases for keeping up to date for the user's access records.

The tasks also include personal or group communication, system and network management, accessing and managing of data, service, and hardware resources, including network and storage devices, file systems, file-folders, files, messages, user security, and so forth without limits. Many of tasks have been described in said prior applications of "Concurrent Web Based Multi-Task Support for Control Management System," and "Display multi-layers item list in web browser with supporting of concurrent multi-users".

After receiving each task information from the web browser 9, the console support software 6 of the control system 2 parses and stores each task information into an available entry in an user space task list. After completing the execution of said task on targeted system, the corresponding entry stored with said task on the user space task list is cleared up. In addition, the console support software 6 of the control system 2 immediately provides a response web page to each web browser 9 in response to each submitted task independent of the completion of the task execution.

In one embodiment, said response updates the original web page in said web browser 9 by encoding with the status of the task, including the task result if the task is successfully completed or include the task execution status if the task is failed or in progress or include a location that said task result will be deposited. Additionally, the WCUWE deploys a lock protecting mechanism for said user space task list and all resources related to each task's execution in the event that multiple tasks may concurrently access and change the state of each mentioned resource.

The WCUWE of the CCDSVM includes software modules of the present invention. For example, the software includes the console support modules 6 of the control system 2, which further includes the web interface/client interface modules 5 for receiving requests from end users' web browser either on the control system 2 or a remote system and includes the distribution control management software modules 4 for control, monitor, and manage the provisioned system units 3. The distributing control management modules 4 also controls user authentication, fault detecting and recovering, contents distributing, and tasks distributing and executing.

The software also includes the service software modules 8 of the provisioned system 3, and other service software 13 of the console system 1, which can be used for send or receive data to/from the control system 2 and provisioned systems 3 using non web-based protocols without web browser's involvement. The current implementation of the WCUWE is based on a proprietary design of this invention. However, the nature and spirit of this invention does not limit to proprietary designed software. The WCUWE of the CCDSVM also includes other proprietary software modules or conventional software such as a web-server 7 of the control system 2, web-browser 9 on the control system 2, the client systems 10, and the console systems 1.

The WCUWE of the CCDSVM can be implemented with suitable or a combination of various suitable programming languages such C, C++, Java, JavaScripts, HTML, XML, and so on. To simplify the discussion, the WCUWE will be used to represent software modules in the CCDSVM described above.

Users of the CCDSVM may be those created by the CCDSVM through a given process or users on the Internet, Intranet, or LAN without registering with the CCDSVM. The WCUWE of the CCDSVM provides user to access various resources and performs various tasks through a preferred model of clicking on graphic or text represented resource objects displayed on a browser.

Figure 4A:
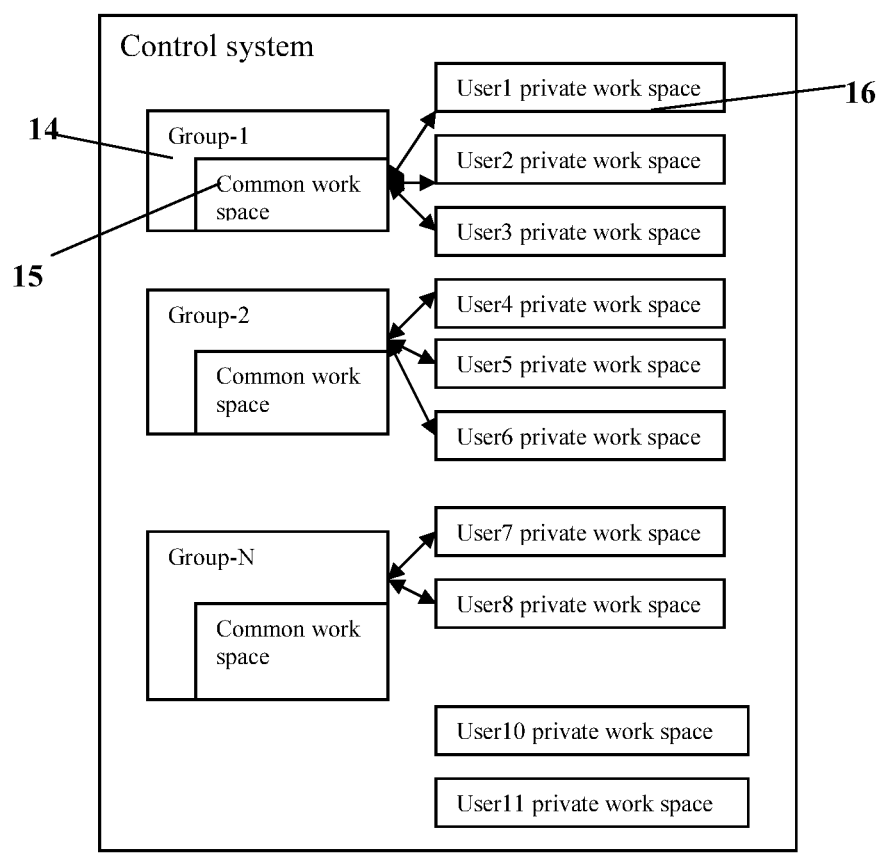
FIG. 4A illustrates an example of dynamic workspace in accordance with one embodiment of the present invention.

The WCUWE is designed to be operated on a CCDSVM platform, and specially designed to provide dynamic workspace illustrated in FIG. 4A to each user associated with various CCDSVM as depicted in FIG. 1, FIG. 2A and FIG. 2B. The WCUWE further facilitates each user to perform tasks for instantly posting resource information to or unposting/withdrawing the user's previously posted resource information in a group model or in a 1-to-1 model for users of the CCDSVM in a same group or without group membership, or for said massive public online users over the network, where said public users do not have accounts with the CCDSVM and can access the public resources provided by the CCDSVM via public web pages.

The dynamic workspace of the WCUWE is a centrally controlled collection of each group's workspace and/or each user's private workspace. The console support software 6 of the control system 2 of the CCDSVM will assign each user a private workspace and each group a common workspace when each user or group account is created by a privileged user after the WCUWE of the CCDSVM enters into an operational mode. A first privileged user is created during installing said software of the CCDSVM. When a user or a group account is created, each user is assigned with specific user security credential and permission and permitted resources based on each user's role. For example, some users are privileged users who can perform system administration tasks and others are general users who can be permitted to access certain types of applications and resources of the CCDSVM.

Figure 4B:
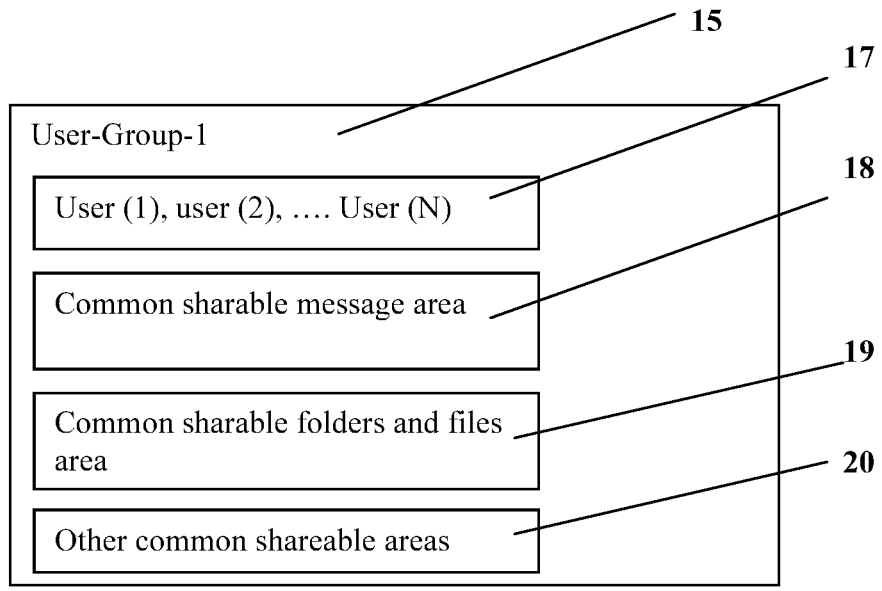
FIG. 4B illustrates an example of possible resources which may be assigned to a user group common workspace in accordance with one embodiment of the present invention.
Figure 5:
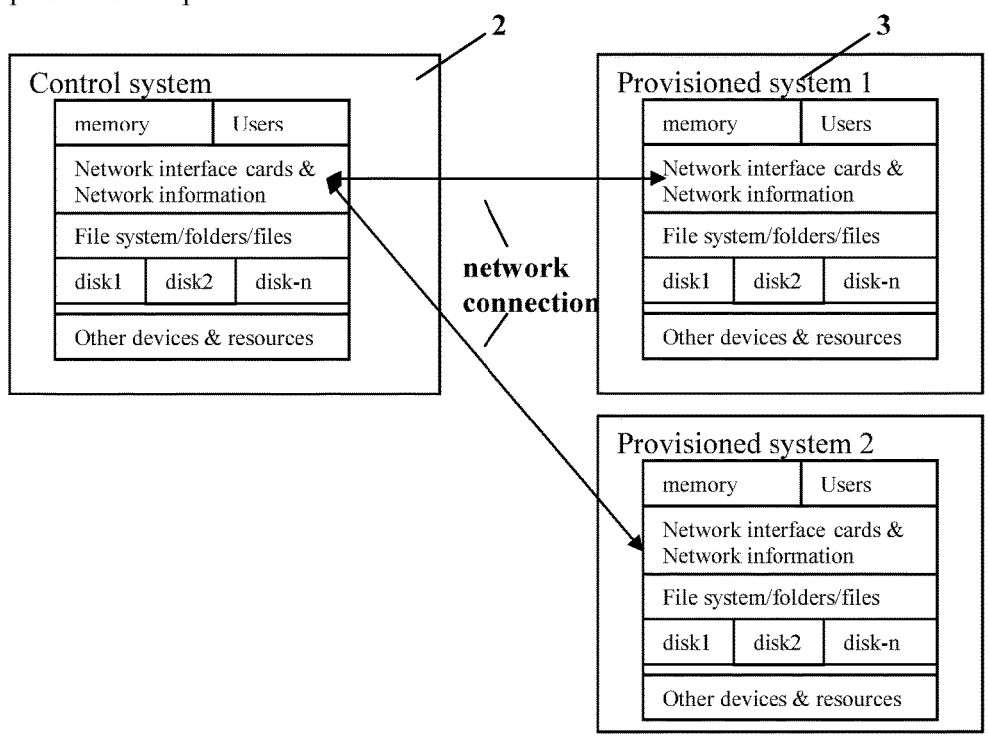
FIG. 5 illustrates an example of resource objects on systems of a CCDSVM in accordance with one embodiment of the present invention. The resource information can be network resources such as the identification information of one or more provisioned systems, which are controlled and grouped by a control system if said control system is not a standalone system; Also, said identification information of each of the provisioned systems includes system name, IP address, and ID such as system service group ID.

A workspace is an organized information structure, which can be saved on storage media such as memory or disk drives or both of memory and disk drives by the console support software 6. A workspace is created during a privileged user performing the tasks of creating user or group. The workspace will be initiated and assigned with limited resources of the CCDSVM such as shown in FIG. 5. Various resources on either provisioned systems 3 and/or on the control system 2 include respective memory, system-groups, systems in a system-group, file systems, file-folders, files, storage media, network media and so on without limits. The common workspace 15, shown in FIG. 4A and FIG. 4B, of each group may be initially assigned with resources information (illustrated in FIG. 5) including users in this group, message area, file systems, file-folders, and files on a specific provisioned system 3 or on the control system 2, and so on. The resources information in the common workspace may also be dynamically assigned or allocated by a permitted user after creating the group account. For example, during an online interactive meeting, a user posts file information to the common workspace 15, so that a new entry of a file node is added to a file and folder tree area of the common workspace.

Figure 4C:
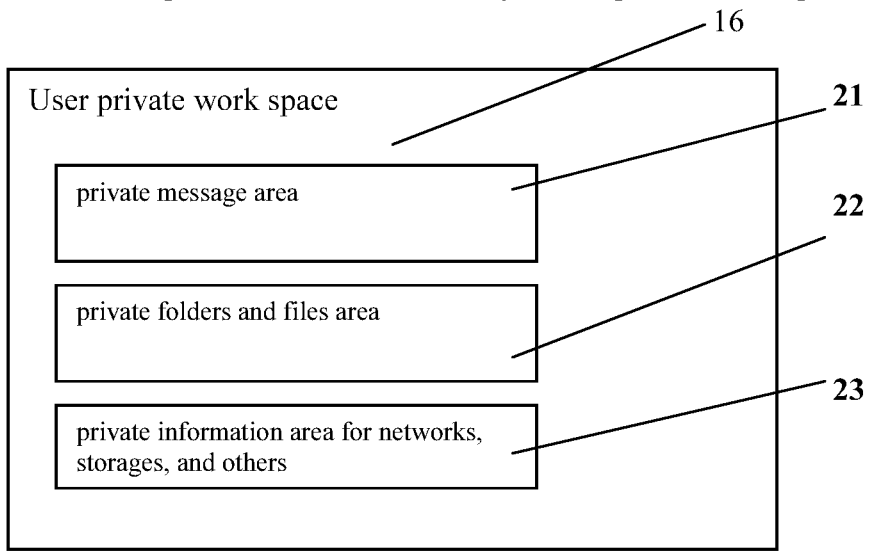
FIG. 4C illustrates an example of a user's private workspace and possible assigned system resources in accordance with one embodiment of the present invention. The managing of resources can be realized via operation menu associated with displayed resource information. For example, a file folder can be associated with an operation menu containing an operating option of creating a file, which is encoded into a web page and to be-displayed in a user's web browser on the user's computing system. Upon the user to select and submit a task of creating a file, an editor can be invoked and displayed in the user's web browser or in a separate displayed area, so that user can input content for the new file and further save it via a save new file operating option to transmit the created file back to the user's default home file folder/directory.

In addition, each group may be assigned with one or multiple users, where each user can also be assigned with a private workspace 16 illustrated in FIG. 4A and FIG. 4C during the user account creation time. Also, one or more users can be dynamically removed from a specific group depending on the needs. The private workspace 16 may also be initially assigned with resources information of the CCDSVM during user account creation time. Thereafter, the private workspace is also dynamically assigned with the resources of the CCDSVM after a user login the CCDSVM.

After creating user and group accounts, a privileged user can dynamically grant or revoke permission for a general user to access one or more mentioned resources from his/her displayed private workspace 16. In one embodiment, the privileged user can select a node containing a list of storage devices on a hardware resource folder tree of the CCDSVM, and further select a posting option from an operation menu and input a targeted user's information for binding the list of storage devices on a system of the CCDSVM to the user's account or select a withdrawing option to remove the list of storage devices from the user account profile. Therefore, during the operation, in one second, the targeted user may see said list in the user's web-browser, and in another second, the user will no longer see the list, which was in the user's displayed private workspace in the web browser. Also, if an authorized user can access a list of storage devices on a provisioned system, and further can take one of devices offline, so that the device list of the provisioned system will have one less devices to be displayed in the user's web browser.

In another example, in one second, a privileged user grants a general user to access a file J in a folder N on a system M of a CCDSVM by selecting the file J and selecting a set access control option from web operation menu to submit a task of set access control for said user, and in another second, the privileged user performs similar steps to reset previous permission, thereby, the general user can view and access the file J in the folder N on the system M of the CCDSVM at one time, and a second later, the general user will not be able to view and access to it. The actual implementation of console support software 6 of control system 2 has achieved this capability.

The total number of users and user groups that can be created is dependent on the capacity of the control system 2 such as how larger the memory and the storage capacity on the control system are. For example, if a user private workspace requires 1 Giga-bytes in storage space and 2 Mega-bytes in memory space, a system with 1-GB memory and 500 GB storage roughly can support 500 users. Similarly, the number of the concurrent users access to the CCDSVM over the network with a certain data rate is also bound by the network bandwidth that the CCDSVM infrastructure can provide.

When a user account is deleted, the private workspace and the user' membership with a group are automatically removed and updated. On the other hand, when a user group is deleted, the group common workspace is deleted, along with removing the group membership from each associated user's security profile without effecting the rest of the user's private workspace. In another embodiment, when a different type of user group is deleted, all accounts of the associated users and their private workspaces are deleted together with the deleting of the group account.

In addition, one or more types of resources in the workspace can be organized as one or more list of tables and can be stored in storage media of the control system 2 as database. The integrity of the security of each group is protected by limiting different resources to different group. As such, each group is authorized to have a limited view over assigned system resources on provisioned systems 3 as well as on the control system 2. The same security integrity at user level can be achieved by assigning different system resources on the provisioned systems 3 and/or the control system 2 to different individual users based on exclusively assigned security permissions and credentials. Therefore, each user is authorized to access and view the assigned resources.

FIG. 4B has shown an example of assigned resources information of a group common workspace 15. There are user area 17, message area 18, and folders and files area 19, and others area 20 in the common workspace 15 of a group. All resource information in the group common workspace 15 can be shared by all users in the same user group. All resources in each group's common workspace can be selectively displayed in a web-browser 9 of each login user, who belongs to the same user group after said resources information in said group being converted to a presentable web format (web page) by the console support software 6 of the control system 2 of the CCDSVM.

FIG. 4C has shown an example of resources in a private workspace 16 of a user, which has a private message area 21, private file and folder area 22, and private network or storage or other information area 23. The assigned resources only can be exclusively viewed and accessed by the designated user unless he/she agrees to share with a peer user crossing group boundary or with peer users in a same group. The folder/directory is a data structure which can hold one or more files and file-folders at logical file system level, and stored on physical storage media.

FIG. 8A has shown an example of displaying an actually implemented portion of a web-page which encoded with assigned resource information tree in a private workspace of a user X, which includes three layers. The top layer includes a system-group-A 33 on said network, which includes a next layer of multiple provisioned systems 3. One of the provisioned systems 3 (system-2) includes a next layer of two private file-folders 32 and 34 of user X, and each file-folder contains a next layer of files that are in the displayed private workspace of the user X.

FIG. 8B has shown another example of displaying an actually implemented portion of a web-page encoded with assigned resources information in a private workspace of a user Y, which includes a control system 2, a private folder 35 and its files in the private workspace of the user Y.

The private workspace of each of the user X and user Y may also include private message area 21 and other resources areas, which are not displayed in FIG. 8A & FIG. 8B because the WCUWE is designed to dynamically display part of user's private workspace in response to each user's needs.

It is notable that said user X and user Y, may be in a same user group such as said group-1, however, each of them has displayed a significantly different private workspace on the control system 2 due to they have been assigned with very different resources of the CCDSVM depending on each user's role and security permission, which setup by privileged user of the CCDSVM through web-based user interface provided by said console support software 6. This is the beauty of the invention of WCUWE for CCDSVM.

The FIG. 6C and FIG. 6D are examples of web-page view in said web-browser 9 of the user X and user Y in the user group-1 before an interactive online meeting. As shown in FIG. 6C and FIG. 6D, the user X or user Y or other users (who's web-pages/browsers are not depicted) in the same user group-1 have entered a group online meeting after their login to the CCDSVM from each browser on each of won native system over said network. Both users X and Y obtain an identical web-page provided by said console support software 6 of the control system 2 except with different contents in the displayed private workspace section of the web-page due to each user has being assigned with different resources. The web page screen layout provided by said console support software modules 6 contains four sections:

1) a private user message input area (section-1),
2) a message displaying section for displaying the common message area 18 illustrated in FIG. 4B for all users in the user-group-1 (section-2),
3) a file or folder display section for displaying a group common file and folder area 19 illustrated in FIG. 4B for all users in the same user group-1 (section-3), and
4) a file and folder tree displaying and management section (section-4) for displaying folder and file tree in a private file and folder area 22, illustrated in FIG. 4C, of a user's private workspace 16.

Initially, said section-1, section-2, and section-3 are all empty due to no one has posted any file information or messages yet. The console support software 6 obtains each log in user's portion of assigned folders and files, for the online meeting, from the stored private file and file-folder area 22 of the private workspace 16 of each user on said storage media, and further converts/encodes said file or folder information into said section-4 of presentable web-format (web page) to be displayable in the web-browser 9 for each user. The choice of total four sections of the web page layout and the order of each section on the browser screen is irrelevant to this invention since other choices of design are also possible, and further, this invention does not have limitations on what the web screen layout shall be. The information of the file or folder (attributes) includes the system name where the file or folder resided, the name and path of the file or folder, the owner of the file or folder, the time stamps, the size of the file and so on without limitations.

During the interactive online meeting, said console support software 6 provides each user to post or un-post files or folders information to/from said section-3 of the displayed group common documents and contents management section with several steps. First, for example, providing said user X to click on a targeted file "Doc 1" 24 or "sub folder-1" (one a time) in the section-4 of displayed said file and folder management area 22 of said user X's private workspace 16. Second, to select the operation of either post or un-post from an operation menu (see FIG. 9A, FIG. 9B, FIG. 10A and FIG. 10B). Finally to click on the selected operation to submit the task of either post or un-post the selected file or folder.

Each user with permission may perform an un-post operation if such user has at least a one previously posted file or folder information, which has already been displayed in the section-3 of the common document and content management section of said web-browser 9 for all login users in said same user-group, see FIG. 6A or FIG. 6B for example.

If a file is selected, said file operation menu is used, and if a folder is selected, the folder operation menu is used respectively. It is also possible to only provide one menu for both file and folder operations by said console support software 6. The operation menu can be pop-up menu for the folder as shown in FIG. 9A, or a pop-up menu for a file as shown in FIG. 9B, or a non-pop-up menu for a folder as shown in FIG. 10A, or a non-pop-up menu for a file as shown in FIG. 10B, or a drop-down menu or just one or more submit buttons. Each operation menu contains one or more operating options for a user to select and submit a corresponding task. The choice of operation menu is irrelevant to this invention although the actual implementation of this part of the invention has used a pop-up menu, and as a matter of fact that there is no limitation on how the operation menu is to be designed in this invention.

In the example of FIG. 6A, the user X can post a file named "Doc 1" 24 to said section-3 of the common document and contents display section of said web-browser 9. In the example of FIG. 6B, the user Y also can post a file named "picture 1" 25 to the common document and contents display section-3 of said web-browser 9. In addition, another not depicted user Z posted a file of "project code". The files or file-folders could be one on said control system 2 or on a provisioned system 3 of the CCDSVM.

In addition, during the interactive online meeting, the console support software 6 of the control system 2 also provides each user to post message to one or more users in the same group via said section-1 of the private user message input section after typing a message and clicking on a "send" button. In the example of FIG. 6A, the user X posted a message of "Msg1 of user X" 26. In the example of FIG. 6B, the user Y also posted a message of "Msg2 of user Y" 27. In addition, another non depicted user Z posted a message of "Msg3 of user Z". As a result, all of three messages were displayed in the same section 2 in each user's browser 9.

In a specific situation, the console support software 6 also provides a permitted user to un-post the previously posted message. Just for an example, in FIG. 6A, said console support software 6 provides the permitted user X to select a previously posted "Msg2 of user Y" 27 from said section-2 of the common message display section in said web-browser 9 of the user X, and select the un-post operation from said operation menu and submit the selected un-post task.

The detailed information of how the post or un-post task to be implemented will be discussed in a few paragraphs later. In addition, with this invention, the action of the "post" information such as posting information of files, or folders, or post messages, or other resources is equivalent to the action of "share" information. The action of "un-post" information is equivalent to the action of "un-share" previously posted or shared information, in other words, to "remove" previously posted or shared information.

After a user submitting the task of the post or un-post from the web-browser 9 of a console system 1 or a client system 10 or the control system 2, the task's data is transmitted to the control system 2, the console support software 6 of the control system 2 obtains and parses the task data to determine: who is the original user initiating the task; what type of task; what type of associated resources for task to work on; who is the targeted user; and what is the time stamp, and may also include other information without limitations. The console support software 6 further determines that if the task is to post a file or folder from an original user, the console support software 6 picks up the corresponding file or folder information that from the file and folder area 22 the private workspace 16 of the original user and deposits such information into the file and folder area 19 of the common workspace 15 of said group in this case.

If the task is to un-post/withdraw a previously posted file or folder, which is posted from a displayed private workspace of a specific user that now in said common workspace 15 of said group, the console support software 6 searches for the corresponding information of the file or folder in the file folder area 19 of said common workspace 15 of said group and further removes the entry of matched information from said common workspace 15 of said group after it is found.

If the task is to post a message to users in said group, the parsed message will be stored in the private message area 21 of the original user's private workspace 16 and the parsed message also is copied to the message area 18 of the common workspace 15 of said user group-1 by said console support software 6.

If a task is to un-post (delete/remove) a previously posted message, the console support software 6 searches for a matching message in said common message area 18 of said common workspace 16 of said group and removes such message entry if it is found based on message and original user's identification and other associated information such as time stamp, security permission and so on without limitation.

It shall be noticed that the task of un-posting a file or folder of this invention does not actually delete the original file and folder from an original user's private workspace 16. In addition, a lock protection mechanism is deployed whenever a message or information of a file or folder is written, stored, or deposited to either said private space 16 or said common workspace 15, or to said disk drives or other storage media. Throughout the rest of the discussion, the lock protection is assumed to be a default action without further mentioning whenever a write/store/deposit action takes place. As a matter of fact, each task of posting a file, folder, and message as well as each task of un-posting a previously posted file, folder, or message performed by multiple users in multiple groups with this invention can be executed by the console support software 6 instantly with memory speed.

FIG. 6A and FIG. 6B illustrate that after the console support software 6 of the control system 2 successfully executing the tasks for each user in the group, each user in said user group can get a fresh view of said section-2 of the common messages display area of user group-1, and a fresh view of said section-3 of the common documents & display area in each user's web-browser 9 on a client system 10 or on a control system 2 or on a console system.

Users can manually click on a refresh-button, which is not shown in the FIG. 6A and FIG. 6B, to refresh the entire web page screen including the corresponding part of screen of either said section-2 or section-3. Also the corresponding part of the browser screen of said section-2 or section-3 can be automatically refreshed. As a matter of fact, optionally, the console support software 6 can provide a run-time script to said web browser 9 via a web-page, which is loaded into the web browser 9 after each user login to the CCDSVM and starting a group online meeting.

The run-time script will automatically and periodically perform tasks of refreshing said section-2 and section-3 of the web page screen. As a matter of fact, the script can control which section to refresh or refresh all sections in a web page. The frequency of the periodic refreshing can be adjusted by said console support software 6 of the CCDSVM depending on the needs of the meeting, which typically can range from 1 to 3 seconds and there is no limitation on this aspect. Also, with the preferred example, said run-time script provided by the WCUWE is a JavaScript, however, other type of programming scripts or methods are also possible and there is no limitation on what kind of run-time program shall be used in this invention. In addition, the console support software 6 provides each user the choices of either automatically or manually refreshing their said web-browser 9.

Upon refreshing said section-2 or section-3 of said web-browser 9 screen of each user, a request of updating such screen will be generated and sent from said web-browser 9 to the control system 2. The console support software 6 obtains and parses each request to determine what user group, and which part of said common workspace 15 of said group need to be updated.

Based on information of each parsed request, the console support software 6 of the control system 2 retrieves the updated resources information from said common workspace 15 of said user group, which includes recently posted files, folders, or messages from each user in said group, and also includes updated list of files and file-folders or messages after un-posting one or more files, folders, or messages by users in the same group. Finally, the console support software 6 of the control system 2 converts/encodes the retrieved information of resources and objects into presentable web-format (web-page).

If the request is to update the group messages, the converted information is sent to the section-2 of the group common message display area in said web-page/web browser 9. If the request is to update the group common files and folders display area, the converted information is sent to the section-3 of said web-browser 9. Therefore, after refreshing said sections in said web-browser 9, each user can have an identical view of all posted files and folders from the section-3 of the group common document display area in said browser 9, and can have an identical view of all messages from the section-2 of the group common message display area in said web-browser 9, which are posted by all other users in a same group. Meanwhile said console support software 6 still allows each user to keep most of the resources information in the user's private workspace 16 un-exposed to other users in the same group during the online interactive meeting.

For example, the user X at his/her web-browser 9 can see "picture 1" 25, illustrated in FIG. 6A posted by the user Y, in the section-3 of group common file and folder display area, but cannot see other information in the user Y's private workspace area 16, yet can see the "Doc 1" posted by the user X himself. Also, the user Y at his/her web-browser 9 can see the "Doc 1" 24, illustrated in FIG. 6B posted by the user X in the section-3 of group common file and folder display area but cannot see other information in the user X's private file and folder display area, yet can see the "picture 1" posted by the user Y himself.

A difference between a conventional Internet group communication model and the group based communication model described in present invention is that the console support software 6 of the control system 2 provides each user to control post or un-post said resources information from the user's private workspace 16 while the conventional Internet communication model is not capable of performing posting/un-posting task. Also, for example, un-posting a previous posted file or folder information with the WCUWE of the CCDSVM does not delete the file or file-folder information nor does it delete the corresponding physical file or file-folder in the user's private workspace while the delete operation with existing Internet group communication model will completely delete an uploaded file in a group. The dynamic workspace of this invention represents a true beauty of the combined security protection of information, and flexibility and efficiency of the online meeting provided by the WCUWE of the CCDSVM to each users and groups online meeting.

In addition, with a preferred example, since posted information of each file is encoded by said console support software 6 with a web link and displayed in said section-3 of the web-browser 9, therefore, each user in a user-group can click on said link to download the file which provided through the private file and folder area of the private workspace of their peer users in group, from a system where the file is located. For example, the user X can download said "picture 1", which may reside one either the control system 2 or on any provisioned system 3, from the user Y. Similarly, the user Y can download said "Doc 1", which also may reside on either the control system 2 or on a provisioned system 3, from the user X at same time. This achieves peer-to-peer exchanging of files on permitted system from permitted users in said user-group. In addition, there is no size limitation for the file to be downloaded, which is a gifted benefit from Internet technology. Again, the web link discussed in present invention just represents a type of reference for pointing to an resource object for user to access in a cross network environment. Therefore, the mentioned use of the web link itself shall not be limited to the concept of the web only environment and it also can be referred to a way to reference an object in a non web-based networked environment.

Besides the exampled and understandable method of download, other methods of retrieving peer users' digital documents or contents are also possible by deploying a more efficient proprietary file transfer mechanism to reach the results of said exchanging a file. It shall be noted that said method of download is only applicable to said files and does not apply to folder and other said resource. To retrieve a targeted peer user's entire folder and its underneath files and sub folders, a special file and folder transfer method is provided. Transferring files and file-folders across systems has been discussed in the prior application of "Display multi-layers list item in web browser with support of concurrent multi-users", via a copy/paste mechanism.

As shown in FIGS. 9A & 9B, and FIGS. 10A & 10B, the console support software 6 of the control system 2 also provides each user to perform many other tasks during online meetings through said operation menu such as upload, rename, delete, copy/paste and so on without limitations. The upload operation allows each user to dynamically upload files one at a time, through a web-browser 9, from a local storage of a client system 10 or console system 1 to any permitted file-folder in said user's private workspace on the control system 2 or on a provisioned system 3 during a meeting, and further to be posted to said common workspace of a user group to which each user belongs.

The user interactive click driven copy/past operation allows files and folders from permitted folders of permitted provisioned systems 3 to be dynamically, physically copied to each user's private workspace on the control system 2, and the information of said files and folders could further to be displayed in said web-page/browser of each user, and further to be posted to the common workspace 15 of the user group; to which each user belong that is additional to directly posting these files or folders without physical copying over. As a matter of fact, operations provided by the console support software 6 of the control system 2 have added efficiency for posting or un-posting files and folders for each user depending on the real needs.

Additionally, said console support software 6 provides each user of each group with the capability of saving the posted messages in the common message area 18 of said common workspace 15 of each group into a file in the common file & folder area of said common workspace 15 of each group. Further, the saved file can be viewed, downloaded by each user in each group with the same method of posting. Besides whenever there is needs, said console support software modules 6 provide user to reset the message area 18 to be empty by removing all message entries in the message area 18 of said user-group's common workspace 16.

An important fact is that the designed WCUWE of the CCDSVM has provided concurrent users, each from a single web browser anywhere on the network to securely perform permitted various tasks, which could be run concurrently within a single web-browser. Because of the console support software 6 of the control system 2 lets each user have an exclusive view for resource objects in the private workspace 16 and in said common workspace 15 of a group which each user belongs to, and lets each user manage resource objects in the user's private space 16, therefore, the multiple users in multiple groups model communication or in 1-to-1 communication can concurrently post or un-post files, folders, messages, or other resource objects without interfering each others. Thus, the workspaces of each user and each group are well protected.

Hence, the console support software 6 of the control system 2 provides privileged users to perform tasks of creating multiple users and/or user groups on the control system 2, and each group can be assigned with variable size of users for online interactive meetings. The total number of users and the total number of groups, and the maximum number of users per group that the WCUWE of the CCDSVM can support is an implementation issue and depends on the capacity of the control system 2. The WCUWE of the CCDSVM and the CCDSVM has been designed with unlimited scalability for both users and provisioned systems 3. On the other hand, the spirit of this invention does not limited to the boundary issues of the WCUWE and the CCDSVM.

FIG. 8A and FIG. 8B illustrate that each user-X and user-Y has a different private workspace than others and each has been assigned with different system resources. Regardless each user is a member of a group or without any group membership, the console support software 6 of the control system 2 can provide the user X and user Y to peer-to-peer instantly posting files or folders one at a time to each other, or instantly un-post the previous posted files and folders through similar steps disclosed before for the group online meeting model at below:

1) facilitate a user capable of clicking on a source file or folder for post or un-post;
2) provide the user to select post operation if the user wants to post any file or folder through operation menu; or provide user to select un-post operation from the operation menu if said user is to un-post a previously posted file or folder;
3) upon submitting a task, facilitate the user to provide input to a prompt of "who is a targeted user?" provided by said console support software 9, and further submit the selected task;
4) the console support software 6 obtains and parses received task information which includes original user, source of the file or folder, type of operation, and other information;
5) If said type of operation is post a file or folder, said console support software 6 deposits the information of said source file or folder to said private file and folder area 22 of said private workspace 16 of the targeted user. If said operation type is un-post a file or folder, said console support software 6 searches a corresponding file or folder information from said private file and folder area 22 of said private workspace 16 of said targeted user to match the source file or folder, if found a match, the corresponding entry of the file or folder is removed from said private file and folder area 22 of said private workspace 16 of the targeted user; and
6) Upon the target user refreshing the web-page in said web-browser 9, the console support software 6 retrieves and converts the updated information in said private file and folder area 22 of private workspace 16 of the targeted user into a presentable web-format (web-page) and transmits said web-page to the web-browser 9 of the target user for displaying and viewing.

For example, as shown in FIG. 8A, the user X can follow said steps 1) to 3) described above to post his "folder 2" 32, in the displayed files and folders area 22 of the private working space 16 in the user X's web-browser 9 to the user Y. As shown in FIG. 8C, upon the user Y refreshing his/her web-browser 9 on a local system by walking through system node, or folder node in a displayed resource tree, the user Y will see said "folder 2" 32 in his/her displayed private file and folder tree of the displayed private workspace of the user Y. As matter of fact, when walking over system node, and file & folder tree nodes in said web-browser 9, a refreshing web-page screen request is generated and to be handled as described previously or in steps described above. As a results of participating in 1-to-1 mode communication with multiple users, a user, such the user X, can view and access multiple folders or files posted by one or more users from each of the user's private workspace. On the other hand, the user X has no permission to delete any resources posted by other users.

In addition to post messages in group-based communication involving parties with two or more users, the WCUWE of the CCDSVM also provides each user to post messages to other user with non-group based 1-to-1 message model. FIG. 7A and FIG. 7B have shown an example of a user X and a user Y, who may not be in a same user group, however, the console support software 6 of the control system 2 provides each user to share and exchange messages with each other from a three section web page in a browser 9.

The section-3 of the web-page in said browser 9 enables a user to work with same steps of non-group based 1-to-1 model of posting files and folders or un-posting the previously posted files or folders as described previously. The section-3 included in FIGS. 7A and 7B is for a demonstration for displaying information under the private workspace of each user. Further, the number of sections in the screen layout and the order of each section in a web page display really is not a limitation to this invention.

The section-1 is user message input area together with an additional input field of "To who", due to unlike in group online meeting, the console support software modules 6 have no knowledge of who the targeted user is in this case. Further, user can post a message with similar said steps as discussed previously in the invention. Nevertheless, unlike with the group meeting messaging model, after obtaining and parsing information of the messages from each user, the console support software 6 of the control system 2 will deposit the message to both the targeted user's and the original user's message areas of each private workspaces. Further, with the same said steps of displaying messages in each user's browser, each user can view both users' sent and received messages in the section-2 of said browser 9.

For example, as shown in FIG. 7A, the user X inputs a message of "msg4 of user X" 30, and types "user Y" in the input field of "To who", and then submits the message by clicking on "Send" button. Similarly, as shown in FIG. 7B, the user Y input a message of "Msg3 of user Y" 31, types "user X" in the input field of "To who", and then submits the message. Upon refreshing the web-page in the web-browser 9 of each user, the user X will see the message 30 he/she sent and the message 31 received from the user Y. Also the user Y will see both messages 30 and 31 at same time.

Again, the design choice of three sections of a web-page display layout and the order of each section is just a preferred example of implementation for non-group based peer user communication. This invention does not limited by the web-screen display layout, for example, a screen display only with said section-1 and section-2 is also possible and so on without limitation, and each section can display one or more same or different resources in one or more user private workspaces or group common workspaces.

The WCUWE of the CCDSVM has provided a security hierarchy for members of any team to work together across multiple locations. With said security hierarchy and said steps of posting or un-posting files and folders, the console support software 6 of the control system 2 can specially provide only a team leader with the capability of posting folders or files that to be viewed and shared by all team members or by an individual member in non-group meeting based environment. In addition, the console support software 6 also provides each team member to post or un-post his/her files or folders to a specific peer user one at a time in a non-group meeting environment. Again the files or folders could be on said control system 2 or on any provisioned system 3.

It is relatively straightforward for the WCUWE of the CCDSVM, more specifically the console support software 6, to support massive online users, who do not have account with the CCDSVM, and can not login the CCDSVM yet can view the dynamically posted files, folders, or messages by users with user account of the CCDSVM.

In a preferred example, such as shown in FIG. 6E, the console support software 6 of the control system 2 provides a public web page to the massive online users, who do not have to login the CCDSVM. The public web page, in one embodiment, could be layout with two major sections with a section-1 to display messages in the sharable message area 18 in a designated user group's common workspace while a section-2 to display files or folders in the sharable file or folder area 19 in said designated user group's common workspace 15.

For users belong to the same designated user-group, each user from a web-browser 9 on a computing system across said network can login to the CCDSVM and obtain said group online meeting web-page as shown in FIG. 6A for the user X and FIG. 6B for the user Y. Further as described previously, each user in said group can instantly post a message to said message area 18 of the designated user group's common workspace 15, or post one file or folder to the sharable file and folder area 19 in the designated user group's common workspace 15, which is associated with said public web page. Also, each user in the user group can instantly perform tasks of un-post previously posted files or folders, which results in removing the corresponding file or folder entry in the file and folder area 19 in the designated user group's common workspace 15 by said console support software 6 of the control system 2, or un-post the previously posted messages from the common message area 18 of the common workspace 15 of said user group.

Meanwhile as previously described and as shown in FIG. 6E, the public web page can be displayed in a browser 9, which may located on one or more public display systems or on each public online user's native system, can be dynamically updated, and further can be viewed by the massive online public users with the same pace and synchronized with identical contents as they being dynamically displayed in said section-2 and section-3 of said web-page/browser 9 displayed during the group online meeting as shown in FIG. 6A and FIG. 6B. Again, said two sections of a web-page display layout is a preferred example and it does not limit this invention because with this invention other layouts are also possible, for example, it may be desired to have a web-page layout that only contains one section, which is either for messages, or files, or folders or for both messages and files depending on the application's need.

As shown in FIG. 8A, FIG. 8B, and FIG. 8C, if a user who had participated in multiple sessions of group based or non-group based peer-to-peer communication and has posted or un-posted many messages, files and file-folders, the user may often do not remember how many materials have been posted for sharing. For example, as shown in FIG. 8A, the user X can select the "folder 2" 32, and select the post on an operation menu, and provide a target "user Y" to share "folder 2" 32. As shown in FIG. 8C, the user Y can see the "Folder 2" 32 of the user X in a web-browser of the user Y after the user X posts the "Folder 2" 32. If the user X selects various files or folders for other dozen people to post and share, the user X will have a difficult time to remember what has been shared and who are the target users. As shown in FIG. 11, the console support software 6 of the control system 2 can provide each user, the user X for example, a sharing control list of how many messages, files or file-folders being posted by him or her and to who.

As shown in FIG. 11, a personal share management list in view of the user X's web-browser 9, an entry of the posted "Folder 2" 30 is listed at the bottom of said control list and it is posted/shared to/with the user Y. Further, said console support software 6 can provide each user to selectively un-post a previously posted files and folders by clicking on a "delete shared?" of operation menu for corresponding entries in the shared control list in web page and further generate un-post operation (task). For example, the user X clicks on "delete share?" to un-post the "Folder 2" 32. Thereafter, as described before, said console support software 6 of the control system 2 will execute the un-post task. Further upon refreshing the targeted user Y's web page/web browser 9 instead of seeing "Folder 2" 32 as shown in FIG. 8C, the user Y will see an updated view of said web page as shown in FIG. 8B, where the "Folder 2" 30 has been removed. The operation menu for "delete share?" is depicted herein just for example only and it could be displayed in any other form.

In addition to provide original user in a group to control un-posting files or folders in group based communication, the console support software 6 of the control system 2 may also provide a privileged user to un-post previously posted files or folders posted by other users in said displayed file and folder section of a web-page. To support this capability, for example, said console support software 6 will provide an operation menu to associate with said displayed files and folders in said display section, further to allow the privileged user to perform the similar un-post operation. After receiving the un-post operation, the console support software 6 will perform similar said searching for the posted file or folder in the group file and folder area 19 of group common workspace 15 of said group, if there is a match found, the corresponding entry will be deleted. Also, the file and folder section of web page/web browser can be refreshed accordingly as described before.

The present invention can apply to update web contents for web portals in enterprises and in personal communication. In one example, the FIGS. 6A and B may represent an internal portal web page, encoded with information in the common workspace 15 of the group 1, and the FIG. 6E's web page display may represent an external portal of that group. The present invention has provided synchronization between these two internal and external web pages in real-time.

In one embodiment, a web page screen of a news portal may be divided into multi-sections including a sports section, medical section, education section, entertainment section, financial section, traveling and vacation section, and technology section so forth without limit. With the CCDSVM, each of the different sections can be assigned to each different corresponding group, which is dedicated for updating the news in the section. For example, 5 sports journalists in a sports group scattering around the world can be assigned to update the sports news section instantly at anytime and anyplace, where the sports section is only associated with the sports group's common workspace 15 and can be updated and refreshed independent of other sections in the web page via a run-time script. In another example, a financial group has 4 journalists being assigned to update the financial section of the web page, which is only associated with the financial group's common workspace 15, and so forth without limits. Of course, the rest of the sections can also be assigned to each dedicated group of journalists.

In another embodiment, a retailer's portal may have multiple sections of a web page layout for displaying hundreds or even thousands of products, where each section may be dedicated to a type of products. By assigning each section to a dedicated group of one or more users, the contents of each section can be much securely and efficiently updated because more users can concurrently working on each section of each web page for entire web pages of any portal without interrupting each others.

Further, each section can be dedicated to encode and display one type of resources posted from each user in a corresponding area of a group common workspace 15 or encode and display with mixed type of resources from multiple areas of a group common workspace 15 such as mixed with photo-picture, text messages, and others, or mixed with streaming video and text messages.

Instead of encoding resources in one or more users' private workspaces 16 into each of the corresponding sections of a web page indirectly via each corresponding group's common workspace, in which each user are the members as described in prior embodiment, each section of a web page can be encoded directly with resources information in one or more users' private workspaces. To accomplish this, the console support software modules 6 of the control system 2 can keep a mapping list between each section and the associated one or more users' private workspaces for a web page. In addition, the console support software 6 can facilitate each user an alternative post operation and an alternative un-post operation to support updating the contents of the assigned section of the web page. Therefore, instead of facilitating each user posting resources information into the user's group's workspace 15 or withdrawing the resource information from the user's group's workspace, the console support software modules 6 facilitate user to tag the resource in his/her private workspace as an indication for posting the resource directly to the assigned section, or to tag the previously tagged and posted resource for withdrawing. In one embodiment, the tagged information can be kept in said list and be stored in a dedicated place in the user's private workspace, or in a central controlled file-folder that the console support software 6 can easy to pick up. Therefore, during the generating of the targeted web page, the console support software modules 6 will encode each section of the web page according to the mapped information list combined with each user's tagged information for updating web contents. Although, this is not as robust as post and un-post operations, it still reduces the usage for group common workspace 15.

Thus, the management of larger volumes of web contents for a complex web portal will become much efficient because it divides the larger amount of works into one or more smaller jobs for each corresponding small section of each web page of a web portal. Therefore, each section can be parallel updated by one or more users yet the updating is independent and without interfering other sections. Second, it is more secure since each section is restricted to be updated by limited users. Also, with this invention, the updating does not require any hardcode for each section due to the nature of posting and withdrawing technology introduced in present invention.

Having briefly described embodiments of the web based network environment in which the present invention operates, FIG. 12 illustrates an example of a computer system 200, which is exemplary for the client system 10, the provisioned system 3, the control system 2, or the console system 1 in which the features of the present invention may be implemented. Process of the web based information exchange can be implemented in any processor-based computer system, such as a PC, a workstation, or a mainframe computer. It will be apparent to those of ordinary skill in the art that other alternative computer system architectures may also be employed.

Referring back to FIG. 12, the computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a web information exchange module 230. Bus 211 is used to transmit information between various components and processor 202 for data processing. Processor 202 may be any of a wide variety of general-purpose processors or microprocessors such as a Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Web based information exchange 230, in one embodiment, is a network control component for facilitating information exchange over the Web. It should be noted that web based information exchange 230 could be software or hardware or a combination of software and hardware components and modules. In one embodiment, it comprises video and audio recording and playback components including digital camera or video or audio encoding and playing back PCI cards such that the on-the-fly recorded streaming video on the computer system 200 can be displayed into each user's web browser or to other viewing mechanism on another remote computer system 200 via communication link over various networks during online information exchanging.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for access to information from remote computers or servers, such as a server or other computers, through a wide-area network. Communication device 225 may include a modem or a network interface device, or other similar devices that facilitate communication between computer 200 and the network. Computer system 200 may be coupled to a number of servers via a network infrastructure such as the infrastructure illustrated in FIG. 1.

The present invention has been described in considerable details with reference to certain examples. However, other versions and examples are also possible, therefore, the spirit of this invention shall not be limited to these examples and/or embodiments. Also, the claims of this invention will be labeled with numbering and in most cases, the numbering does not represent any sequence or order unless specifically described as the steps of a method.

The invention claimed is:

1. A virtual server, comprising:
at least one hardware processor, and
one non-transitory computer-readable medium comprising program code that, when executed by the at least one hardware processor, causes the virtual server accessing a plurality of files and to control posting and un-posting information that include:
A) presenting a first user interface on a first device of a first user and a second user interface on a second device of a second user upon each of the first and second users log on to the virtual server, each of the user interfaces presented comprising co-existing sections of:
a private section designated for displaying information of files available for posting; and
a common section designated for displaying information of files posted by users and for controlling un-posting the posted files;
B) posting files, comprising:
parsing a request for posting a first file by the first user via the private section of the first user interface submitting the request for the first file accessible to the second user;
storing information, but not content, of the first file into a storage space according to said parsing, wherein the first file is remote from the storage space; and
causing to display the stored information of the first file in the common section of each of the user interfaces for the second user through the stored information displayed accessing the content of the first file; and
C) un-posting the posted files, comprising:
parsing a request for un-posting the first file upon the first user through the common section submitting the request;
searching posted information of a file in the storage space for matching with the first file according to the parsing,
deleting the stored information of the first file from the storage space without deleting the first file physically upon finding said matching, and
causing to delete the displayed information of the first file from the common section of each of the user interfaces according to said parsing.

2. The virtual server of claim 1, wherein said parsing includes parsing information of a file, the information of the file comprising at least name, ownership, size, timestamp, or location of the file, wherein the content of the file comprises bytes not used for metadata.

3. The virtual server of claim 2, wherein said location of a file comprises a path of the file and a name of a system on which the file physically resides, the path facilitates an address to the file for remote access.

4. The virtual server of claim 1, wherein the storage space is exclusively allocated to a group of users including the first and second users for storing posted information and comprises at least one file area for storing information of posted files and one message area for storing posted messages.

5. The virtual server of claim 1, wherein said posting or un-posting file further comprises: activating a runtime script to automatically present the stored information of the first file onto the common section or remove the displayed information of the first file from the common section on each of said first and second user interfaces.

6. The virtual server of claim 1, wherein said files available for posting further comprises: at least one or more files of said files physically residing on one or more computing devices, wherein a controller of the virtual server obtains information of the one or more files from the one or more computing devices across a network.

7. The virtual server of claim 1, wherein said program code further causes the virtual server to facilitate the second user posting a second file for the second file accessible to the first user, wherein the information of the second file is displayed in the common section on each of the first and second user interfaces through the storage space.

8. The virtual server of claim 1, wherein said to control un-posting the posted files further comprises: facilitating a sharing control list to the first user, wherein each entry on the list comprises information of a file posted by the first user and associates with an operating menu for un-posting the file.

9. The virtual server of claim 1, wherein each of the first and second user interfaces further comprises a message input section for each of the first and second users posting messages.

10. The virtual server of claim 9, wherein the program code further causes the virtual server to control:
a) posting messages, comprising:
parsing a request for posting a first message upon the first user via the first user interface submitting the request for the first message accessible to the second user;
storing the first message into the storage space according to said parsing; and
causing to display the stored first message in the common section of each of the first and second user interfaces for the second user accessing the first message; and
b) un-posting the posted messages, comprising:
parsing a request for un-posting the first message upon the first user through the common section of first user interface submitting the request;
searching a posted message in the storage space for matching with the first message according to the parsing,
deleting the posted first message from the storage space upon finding said matching, and
causing to delete the first message from the common section of each of said user interfaces according to said parsing.

11. The server of claim 10, wherein said program code causing the server to control post or un-post messages further comprises: activating a runtime script for automatically presenting the stored first message onto or removing the displayed first message from the common section of each of the first and second user interfaces.

12. The server of claim 10, wherein said program code further causes the virtual server to facilitate the second user posting a second message for the second message to be displayed in the common section of each of the first and second user interface through the storage space.

13. The server virtual of claim 12, wherein each of the first and second messages further comprises at least associated information of timestamp or original user who posted the message.

14. The virtual server of claim 10, wherein said program code causing the virtual server to control stop sharing messages further comprises: facilitating an operation menu to be associated with the displayed first message in the common section of the first user interface for facilitating the un-posting operation.

15. A method implemented by a server accessing a plurality of files for posting and un-posting information, the method comprising:
a) allocating a storage space for storing posted information;
b) presenting a first user interface on a first device of a first user and a second user interface on a second device of a second user upon each of the first and second users log on to the server, each of the presented user interfaces comprising co-existing sections of:
a private section designated for displaying information of files available for posting; and
a common section designated for displaying information of files posted by users including the first and second users and for controlling un-posting the posted files via associated operation menu;
c) posting files, comprising:
parsing a request for posting a first file by the first user via the private section of first user interface submitting the request for the first file accessible to the second user;
storing information, but not content, of the first file into the storage space according to said parsing, wherein the first file is remote from the storage space; and
displaying the stored information of the first file on the common section of each of the user interfaces for the second user through the stored information displayed accessing the content of the first file; and
d) un-posting the posted files, comprising:
parsing a request for un-posting the first file upon the first user through the common section submitting the request;
searching posted information of a file in the storage space for matching with the parsed request for un-posting the first file,
deleting the stored information of the first file from the storage space without deleting the first file physically upon finding said matching, and
causing to delete the displayed information of the first file from the common section of each of the user interfaces according to said parsing.

16. The method of claim 15, wherein each of the first and second user interfaces comprises: a message input section for posting messages in the common section of the each of the first and second user interfaces through the storage space.

* * * * *